US010902563B2

(12) United States Patent
Hung

(10) Patent No.: US 10,902,563 B2
(45) **Date of Patent: *Jan. 26, 2021**

(54) MORAN'S / FOR IMPULSE NOISE DETECTION AND REMOVAL IN COLOR IMAGES

(71) Applicant: Kennesaw State University Research And Service Foundation, Inc., Kennesaw, GA (US)

(72) Inventor: Chih-Cheng Hung, Marietta, GA (US)

(73) Assignee: Kennesaw State University Research and Service Foundation, Inc., Kennesaw, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,540

(22) Filed: Oct. 18, 2019

(65) Prior Publication Data

US 2020/0118251 A1 Apr. 16, 2020

Related U.S. Application Data

(63) Continuation of application No. 15/830,031, filed on Dec. 4, 2017, now Pat. No. 10,572,978.

(60) Provisional application No. 62/429,895, filed on Dec. 5, 2016.

(51) Int. Cl.

| | |
|---|---|
| ***G06K 9/00*** | (2006.01) |
| ***G06T 5/00*** | (2006.01) |
| ***G06T 5/20*** | (2006.01) |
| ***G06K 9/52*** | (2006.01) |
| ***G06T 7/90*** | (2017.01) |
| ***G06K 9/46*** | (2006.01) |
| ***G06K 9/40*** | (2006.01) |

(52) U.S. Cl.

CPC ................ *G06T 5/002* (2013.01); *G06K 9/40* (2013.01); *G06K 9/4609* (2013.01); *G06K 9/522* (2013.01); *G06T 5/20* (2013.01); *G06T 7/90* (2017.01); *G06T 2207/10024* (2013.01); *G06T 2207/20032* (2013.01)

(58) Field of Classification Search

CPC .. G06T 5/002; G06T 7/90; G06T 5/20; G06T 2207/10024; G06T 2207/20032; G06K 9/40; G06K 9/4609; G06K 9/522

USPC .......................................................... 382/167

See application file for complete search history.

(56) References Cited

U.S. PATENT DOCUMENTS

| | | | | |
|---|---|---|---|---|
| 10,572,978 | B2 * | 2/2020 | Hung | G06K 9/4609 |
| 2009/0202124 | A1 * | 8/2009 | Matsuda | G06T 7/0014 382/128 |
| 2012/0213271 | A1 * | 8/2012 | Chong | H04N 19/14 375/240.02 |

OTHER PUBLICATIONS

Smolka, Soft switching technique for impulsive noise removal in color images, 5th International Conference on Computational Intelligence, Communication Systems and Networks, p. 222-227 (Year: 2013).*

Chen et al, A novel image quality index using Moran I statistics, Physics in Medicine and Biology, 48(8):N131-N137 (Year: 2003).*

(Continued)

*Primary Examiner* — Andrew M Moyer

(74) *Attorney, Agent, or Firm* — Smith, Gambrell & Russell LLP

(57) ABSTRACT

A method for impulse noise detection and removal in color images comprising a detection module and a vector median filter.

9 Claims, 29 Drawing Sheets

(56) References Cited

OTHER PUBLICATIONS

Kenney, C., et al. "Peer group image enhancement." IEEE Transactions on Image Processing 10.2 (2001): 326-334. (Year: 2001).*
Abreu et al, A New Efficient Approach for the Removal of Impulse Noise from Highly Corrupted Images, IEEE Transaction on Image Processing, vol. 5, No. 6, pp. 1012-1025 (1996).
Ahmed et al, Removal of High-Density Salt-and-Pepper Noise in Images with an Iterative Adaptive Fuzzy Filter Using Alpha-Trimmed Mean, IEEE Transaction on Fuzzy Systems, vol. 22, No. 5, pp. 1352-1358 (2014).
Astola et al, Vector median filters, in Proc. IEEE, 78(4), pp. 678-689 (1990).
Celebi et al, Nonlinear vector filtering for impulse noise removal from color images, Journal of Electronic Imaging, 16(3), 65 pages (2007).
Celebi et al, Robust switching vector median filter for impulse noise removal, Journal of Electronic Imaging 17 (4), p. 043006-1 to 9 (2008).
Chang et al, A Denoising Algorithm for Remote Sensing Images with Impulse Noise, IEEE International Conference on Geoscience and Remote Sensing (IGARSS 2016), Beijing China, Jul. 10-15, p. 2905-2908 (2016).
Chen et al, A novel image quality index using Moran I statistics, Physics in Medicine and Biology, 48(8):N131-N137, 2003.
Chen et al., Adaptive impulse detection using center-weighted median filter, IEEE Signal Process Letters, vol. 8, No. 1, pp. 1-3, (2001).
Chuang and Huang, Assessment of noise in a digital image using the join-count statistic and the Moran test, Physics in Medicine and Biology, 37(2):357-69, 1992. (abstract only).
Eng et al, Noise Adaptive Soft-Switching Median Filter, IEEE Transaction on Image Processing, vol. 10, No. 2, pp. 242-251, (2001).
Kenny et al., Peer group image enhancement, IEEE Transaction on Image Processing, vol. 10, No. 2, pp. 326-334, (2001).
Lebrun et al, Secrets of image denoising cuisine, Acta Numerica, 81 pages, Cambridge University Press, (2012).
Liu, Adaptive scalar and vector median filtering of noisy color images based on noise estimation, IET Image Process, vol. 5, No. 6, pp. 541-553, (2010).
Lucak et al, Vector sigma filters for noise detection and removal in color images, Journal of Visual Communication & Image Representation, 17, pp. 1-26 (2006).
Lukac et al, Color Image Processing, Method and Applications, FL: CRC Press, 29 pages (2007).
Lukac et al., Application of the adaptive center-weighted vector median framework for the enhancement of cDNA microarray images, International Journal of Applied Mathematics and Computer Science, vol. 13, No. 3, pp. 369-383 (2003).
Lukac et al., Vector filtering for color imaging, open a world of possibility, IEEE Signal Processing Magazine [74], 13 pages (2005).
Malpica et al., SSIM based range image quality assessment, 4th international workshop on Video Processing and Quality Metrics for Consumer Electronics, Scottsdale, Arizona, 6 pages (2009).
Moran, The interpretation of statistical maps, Journal of the Royal Statistical Society Series B10, pp. 243-251 (1948).
Nagabhushna, Quality assessment of resultant images after processing, Computer Engineering and Intelligent Systems, ISSN 2222-1719, vol. 3, No. 7, p. 105-112 (2012).
Novoselac et al, Image noise deduction by vector median filter, 54th International Symposium ELMAR-2012, Zadar, Croatia, 6 pages, (2012).
Rogerson, Statistical methods for geography, 2nd ed. London, UK: Sage Publications, 11 pages (2006).
Smolka et al, Generalized vector median filter, Proceedings of the 5th International Symposium on image and Signal Processing and Analysis, p. 254-257, (2007).
Smolka et al, Nonlinear techniques for color image processing, in Nonlinear Signal and Image Processing: Theory, Methods, and Applications (Editors: K.E. Bapner and G.R. Arce), pp. 445-505, Boca Raton, FL: CRC Press (2004).
Smolka et al., Fast detection and impulsive noise removal in color images, Real-Time Imaging, 11, pp. 389-402 (2005).
Smolka, Soft switching technique for impulsive noise removal in color images, 5th International Conference on Computational Intelligence, Communication Systems and Networks, p. 222-227, (2013).
Xie et al, A validity measure for fuzzy clustering, IEEE Transactions on Pattern Analysis and Machine Intelligence, vol. 13, No. 8, pp. 841-847, (1991).
Zhang et al, A new impulse detector for switching median filters, IEEE Signal Processing Letters, vol. 9, No. 11, p. 360-363 (2002).
Zhou, Cognition and removal of impulse noise with uncertainty, IEEE Transaction on Image Processing, vol. 21, No. 7, pp. 3157-3167, (2012).

* cited by examiner $$\omega = \begin{array}{c} \\ A \\ B \\ C \\ D \\ E \\ F \end{array} \begin{array}{c} \begin{array}{cccccc} A & B & C & D & E & F \end{array} \\ \left[\begin{array}{cccccc} 0 & 1 & 1 & 0 & 0 & 0 \\ 1 & 0 & 1 & 1 & 1 & 0 \\ 1 & 1 & 0 & 1 & 0 & 1 \\ 0 & 1 & 1 & 0 & 1 & 1 \\ 0 & 1 & 0 & 1 & 0 & 0 \\ 0 & 0 & 1 & 1 & 0 & 0 \end{array}\right] \end{array}$$

| | | |
|---|---|---|
| 0 | 0 | 0 |
| -1 | 2 | -1 |
| 0 | 0 | 0 |

| | | |
|---|---|---|
| 0 | -1 | 0 |
| 0 | 2 | 0 |
| 0 | -1 | 0 |

| | | |
|---|---|---|
| 0 | 0 | -1 |
| 0 | 2 | 0 |
| -1 | 0 | 0 |

| | | |
|---|---|---|
| -1 | 0 | 0 |
| 0 | 2 | 0 |
| 0 | 0 | -1 |

FIG. 6B

| | | |
|---|---|---|
| 255 | 0 | 0 |
| 0 | 0 | 0 |
| 0 | 0 | 255 |

(a)

| | | |
|---|---|---|
| 255 | 0 | 0 |
| 0 | 255 | 0 |
| 0 | 0 | 255 |

(b)

| | | |
|---|---|---|
| 0 | 0 | 0 |
| -1 | 2 | -1 |
| 0 | 0 | 0 |

(c)

| | | |
|---|---|---|
| 0 | -1 | 0 |
| 0 | 2 | 0 |
| 0 | -1 | 0 |

(d)

| | | |
|---|---|---|
| 0 | 0 | -1 |
| 0 | 2 | 0 |
| -1 | 0 | 0 |

(e)

| | | |
|---|---|---|
| -1 | 0 | 0 |
| 0 | 2 | 0 |
| 0 | 0 | -1 |

(f)

Original image

15% impulse noise added

VMF

BVDF

CWVMF

ACWVMF

PGVMF

RSVMF

MIVMF

Original image

15% impulse noise added

VMF

BVDF

CWVMF

ACWVMF

PGVMF

RSVMF

MIVMF

Original image

15% impulse noise added

VMF

BVDF

CWVMF

ACWVMF

PGVMF

RSVMF

MIVMF

| | 1 | 2 | 3 | 4 | 5 | 6 |
|---|---|---|---|---|---|---|
| VMF | 19.75 | 19.28 | 18.86 | 18.62 | 18.45 | 18.33 |
| BVDF | 16.5 | 16.38 | 15.94 | 15.6 | 15.27 | 15.06 |
| CWVMF | 19.46 | 19.14 | 18.64 | 18.4 | 18.2 | 18.08 |
| ACWVMF | 19.61 | 19.29 | 18.86 | 18.66 | 18.48 | 18.39 |
| PGVMF | 19.08 | 18.24 | 17.71 | 17.46 | 17.29 | 17.18 |
| RSVMF | 22.79 | 21.72 | 21.34 | 21.18 | 21.1 | 21.07 |
| MIVMF | 24.18 | 23.72 | 23.6 | 23.58 | 23.57 | 23.57 |

Number of Iterations

VMF BVDF CWVMF ACWVMF
PGVMF RSVMF MIVMF

| | 1 | 2 | 3 | 4 | 5 | 6 |
|---|---|---|---|---|---|---|
| VMF | 24.94 | 24.1 | 23.55 | 23.24 | 23.05 | 22.91 |
| BVDF | 20.48 | 19.94 | 19.28 | 18.91 | 18.64 | 18.41 |
| CWVMF | 24.4 | 23.65 | 23.05 | 22.72 | 22.5 | 22.36 |
| ACWVMF | 24.96 | 24.21 | 23.71 | 23.44 | 23.26 | 23.15 |
| PGVMF | 23.56 | 22.3 | 21.65 | 21.34 | 21.16 | 21.05 |
| RSVMF | 28.47 | 27.3 | 26.88 | 26.7 | 26.61 | 26.56 |
| MIVMF | 29.49 | 29.66 | 29.61 | 29.59 | 29.59 | 29.59 |

| | 1 | 2 | 3 | 4 | 5 | 6 |
|---|---|---|---|---|---|---|
| VMF | 24.58 | 23.15 | 22.31 | 21.83 | 21.52 | 21.32 |
| BVDF | 19.63 | 18.97 | 18.28 | 17.8 | 17.45 | 17.18 |
| CWVMF | 24.27 | 23.03 | 22.16 | 21.67 | 21.34 | 21.14 |
| ACWVMF | 24.92 | 23.79 | 23.09 | 22.7 | 22.46 | 22.3 |
| PGVMF | 23.59 | 22.16 | 21.26 | 20.79 | 20.51 | 20.34 |
| RSVMF | 28.68 | 27.39 | 26.93 | 26.75 | 26.66 | 26.63 |
| MIVMF | 29.13 | 30.31 | 30.33 | 30.33 | 30.33 | 30.33 |

Number of Iterations

VMF BVDF CWVMF ACWVMF
PGVMF RSVMF MIVMF

| | 1 | 2 | 3 | 4 | 5 | 6 |
|---|---|---|---|---|---|---|
| VMF | 18.71 | 18.46 | 18.07 | 17.85 | 17.7 | 17.6 |
| BVDF | 14.66 | 15.27 | 15.14 | 14.92 | 14.76 | 14.54 |
| CWVMF | 18.45 | 18.33 | 17.91 | 17.68 | 17.51 | 17.41 |
| ACWVMF | 18.56 | 18.42 | 18.05 | 17.85 | 17.73 | 17.63 |
| PGVMF | 18.39 | 18.24 | 17.27 | 17.01 | 16.83 | 16.73 |
| RSVMF | 20.43 | 20.28 | 20.01 | 19.89 | 19.82 | 19.78 |
| MIVMF | 27.91 | 26.76 | 26.51 | 26.44 | 26.43 | 26.43 |

MORAN'S / FOR IMPULSE NOISE DETECTION AND REMOVAL IN COLOR IMAGES

CROSS-REFERENCE TO RELATED APPLICATIONS

This application is a continuation application of U.S. Nonprovisional application Ser. No. 15/830,031 filed Dec. 4, 2017, which claims priority to U.S. Ser. No. 62/429,895 filed Dec. 5, 2016, each of which are hereby incorporated by reference in their entirety.

BACKGROUND

Noise degrades image quality and causes difficulty in further processing.

A de-noising filter and algorithm to enhance image processing, particularly in color images and particularly in removing impulse noise, is disclosed.

The algorithm efficiently detects and removes the random-valued impulse noise in color images, based on the fundamental of Moran's I statistics and Laplacian kernels.

The inventive algorithm for noise detection and removal in color images consists of three major components: Moran's I for spatial autocorrelation, four 1-D Laplacian kernels, and the Vector Median Filter (VMF). The previous two components are used for noise detection in the algorithm, and the VMF is for de-noising.

The filter is effective in removing impulse noise, based on a preliminary study on multispectral images. The following vector-type median filters have been tested and compared: Vector Median Filter (VMF), Basic Vector Directional Filter (BVDF), Center Weighted Vector Median Filter (CWVMF), Adaptive Center Weighted Vector Median Filter (ACWVMF), Peer Group Vector Median Filter (PGVMF), and Robust Switching Vector Median Filter (RSVMF).

Impulse noise is one type of noise that can occur in digital images. In image processing, filters such as CWVMF, ACWVNF PGVMF, and RSVMF remove impulse noise. Impulse noise randomly and sparsely corrupts pixels to two intensity levels, relative high or relative low, compared with its neighboring pixels.

To remove heavy noise in an image, it is necessary to repeat the filter several times. However, under these conditions most de-noising filters will blur and distort the image. Thus, improvements are needed.

SUMMARY

The present disclosure relates to an image de-noising algorithm requires an image noise model to improve the signal-to-noise-ratio (SNR) in digital images.

The inventive de-noising algorithm is applicable to de-noise impulse noise and, when the filter is repeated several times, does not blur or distort the image. The algorithm causes the filter to "converge" to a saturated state.

The major sources of noise corrupted in most digital images are from the process of image acquisition, quantization, and transmission. As one common example, when an image is transmitted through some wireless mobile networks, it may be ruined with noisy signals from atmospheric disturbances such as thunder and lightning in the environment. Thus, an image may be degraded such that it will not have the same original quality. The consequence of degraded images can create potential problems for further image processing and analysis. For example, a clustering algorithm for segmenting an image usually measures the relationships in the pixel space by categorizing the pixels into different classes. Therefore, the existence of noise pixels will create different attributes for pixels that originally belonged to the same cluster. This may generate different clustering outcomes.

The inventive algorithm removes noise in color images and restores the image, resulting in an image identical or as similar as possible to the original image.

Algorithms for removing noise in images are divided into two methods: one for gray-scale images and one for color images. Many state-of-the-art noise removal algorithms have been proposed in the past decades for the gray-scale image. As digital imaging technology has advanced, the necessity for color image processing has been in great demand. Color and multichannel images are most common in many areas of imaging applications, even though gray-scale image processing is required in specific fields such as medical imaging on X-ray computed tomography.

An important prerequisite to building the algorithm for de-noising filters is taking on the noise models for color images. Image noise occurs in a wide variety of forms. It is very common for noise to contaminate the pixels of images taken by the sensor. During the digitization and transmission processes, noise can be introduced into each pixel where one or more bit-errors will be embedded in the pixels of images. The Gaussian noise model and impulse noise model are two widely used models to characterize the noise information for de-noising filters in digital image processing. The Gaussian model is convenient to simulate noise in order to design and test efficiency of a denoising algorithm. If the noise causes pixel data loss or saturation, the impulse noise model, also called salt-and-pepper noise, will be suitable for the noise characterization. There are also different noises caused by devices, e.g., shot noise is due to the thermal fluctuations of stationary charge carriers, dark noise occurs in image sensors such as charge-coupled devices (CCDs).

Several different formulations exist for the impulse noise model. Each formulation has its own characteristic in generating how the density level of noise will be assigned and how three color channels will be corrupted with certain level of probability. The model assumes that the density level of noise probability is δ, and the k value is the color channel index for red, blue, and green. For convenience, the model assumes that red, green, and blue channel is assigned as 1, 2, and 3 respectively and 8-bit pixel image. If δ is assigned as 0.2, the 20 percent of entire pixels of a given image is noise.

The first impulse noise model which is uncorrelated impulsive noise 10 is formulated as follows:

$$x^k = \begin{matrix} r^k \text{ with probability} \delta \\ \text{or} \\ o^k \text{ with probability} 1-\delta \end{matrix} \qquad (1)$$

where $k - 1, 2, \text{and } 3$ where $r^k$ stands for the random vector that represents the impulse noise corruption with $r^k \in [0]$ or $r^k \in [255]$ (with equal probability), and $o^k$ represents original color vectors. Those two vectors result in the final outcomes $x^k$ of corrupted image with impulse noise restricted to 0 or 255. This model is called a "salt-and-pepper" impulse noise type and is limited to only one channel corruption at a time for all three channels.

The second impulse noise model is based on the correlation of impulse noise distribution among the color channels and can be expressed as follows:

$$X = \begin{cases} [o^1, o^3, 0^3] \text{ with probability } 1-\delta \\ [r^1, o^2, o^3] \text{ with probability } \delta_1 \text{ for channel 1 (under } \delta) \\ [o^1, r^2, o^3] \text{ with probability } \delta_2 \text{ for channel 2 (under } \delta) \\ [o^1, o^2, r^3] \text{ with probability } \delta_3 \text{ for channel 3 (under } \delta) \\ [r^1, r^2, r^3] \text{ with probability } \delta_4 \text{ for channels (under } \delta) \end{cases} \quad (2)$$

where X represents a pixel vector, and r and o are similarly defined as in equation (1). $\delta_1$, $\delta_2$, and $\delta_3$ represent the respective probability of each channel corruption (these parameters were set up as $\delta_1=\delta_2=\delta_3=\delta_4=0.25$ in Ref. 10). For example, if we assume that the noise level is 0.1 (i.e. 10% noise density), the δ value is 0.1. Each individual channel $\delta_i$ will be given 0.25 probabilities under the overall 10% probability. Consequently, the combination of single channel corruptions from $\delta_1$, $\delta_2$, and $\delta_3$ and all channel corruption will be added up to 0.1 probability in total. The problem of this model is that it limits the noise corruption either on a single channel only or three channels simultaneously, but does not permit two channels for the noise corruption simultaneously, which may not be realistic in practical applications.

The noise model used in the invention is not limited to one channel for noise corruption. The noise signal used is also not limited to two relative high and low values (i.e. values close to 0 or 255). The model assumes that random-valued noise corruption on the multiple channels simultaneously with randomized noise level from 0 to 255, and assumes that all channels are corrupted with the probability δ. The impulse noise model used is depicted in equation (3). This model allows multiple channels to have corrupted impulse noises compared to the model in equation (2). As a result, the comparison in terms of visual perception of noise corruption level is more severe than noise model (2). Noise model (1) shown in FIG. 1(*b*) looks more noisy than the inventive model shown in FIG. 1(*d*) due to the difference of the three-channel noise (i.e. color) and salt-and-pepper; the latter makes dark and white noises more prominent compared with the color.

$$x^k = \begin{cases} [o^1, o^2, o^3] \text{ with probability} 1-\delta \\ \text{or} \\ [r^1, r^2, r^3] \text{ with probability} \delta \end{cases} \quad (3)$$

BRIEF DESCRIPTION OF THE DRAWINGS

FIGS. 5A-B shows an area of six regions represented by A, B, C, D, E, and F with a value associated with each region (FIG. 5A) and corresponding binary connectivity matrix (FIG. 5B).

FIG. 6A shows four 1-D Laplacian kernels with a size of 3 by 3; FIG. 6B is a hypothetical example slowing a line with noise in grid (a) with 0 as the noise in the center pixel and without noise in grid (b); grid (c) horizontal, grid (d) vertical, grid (e) 45 degree, and grid (f) 135 degree directions.

FIG. 9A is an original image, FIG. 9B shows 15% impulse noise added, and FIGS. 9C-I are results of VMF, BVDF, CWVMF, ACWVMF, PGVMF, RSVMF and MIVMF (i.e. the inventive filter), respectively.

FIG. 10A is an original image, FIG. 10B shows 15% impulse noise added, and FIGS. 10C-I are results of VMF, BVDF, CWVMF, ACWVMF, PGVMF, RSVMF and MIVMF (i.e. the inventive filter), respectively.

FIG. 11A is an original image, FIG. 11B shows 15% impulse noise added, and FIGS. 11C-I are results of VMF, BVDF, CWVMF, ACWVMF, PGVMF, RSVMF and MIVMF (i.e. the inventive filter), respectively.

FIG. 15A shows Parrot corrupted with 5% noise, FIG. 15B shows Penguin corrupted with 5% noise, FIG. 15C shows Koala corrupted with 5% noise, and FIG. 15D shows Parrot corrupted with 15% noise. Each filter was run six times in the experiments and then each PSNR was calculated for each run.

Table 1 compares MF and VMF for Lena image with entropy value: 15.12 and s denotes seconds.

Table 2 compares MF and VMF for peppers image with entropy value: 15.30 and s denotes seconds.

Table 3 compares MF and VMF for baboon image with entropy value: 15.90 and s denotes seconds.

Table 4 shows filters being compared in this disclosure.

Table 5 (a) is a hypothetical example of 3×3 filtering Window (one channel only), (b) its pixel numbering scheme for the pixels in (a), and (c) the binary connectivity (i.e. adjacency) matrix for (a) which shows which pixel is adjacent (marked by 1) to pixel number from 0 to 8. Otherwise, 0 will be used for non-adjacency. For example, for pixel 0, pixels 1, 3, and 4 are adjacent to it.

Table 6 shows Threshold Testing with Lena Image: Entropy 15.12.

Table 7 shows Threshold Testing with Peppers Image: Entropy 15.30.

Table 8 shows Threshold Testing with Baboon Image: Entropy 15.90.

Table 9 shows results on Ocean image.

Table 10 shows results on F-16 image.

Table 11 shows results on Mountain image.

Table 12 shows results on Caster image.

Table 13 shows results on IC motherboard image.

Table 14 shows additional parameters for some filters used.

Table 15 shows test results of Lena with entropy 15.12 and $T_0$=67 in 5%, 10% and 15% noise levels; s denotes seconds.

Table 16 shows test results of Peppers with entropy 15.30 and $T_0$=68 in 5%, 10% and 15% noise levels; s denotes seconds.

Table 17 shows test results of Baboon with entropy 15.90 and $T_0$=109 in 5%, 10% and 15% noise levels; s denotes seconds.

Table 18 compares RSVMF and MIVMF on Heavy Noise Added Lena Image; s denotes seconds.

Table 19 compares RSVMF and MIVMF on Heavy Noise Added Peppers Image; s denotes seconds.

Table 20 compares RSVMF and MIVMF on Heavy Noise Added Baboon Image; s denotes seconds.

DETAILED DESCRIPTION

Figure 1A:
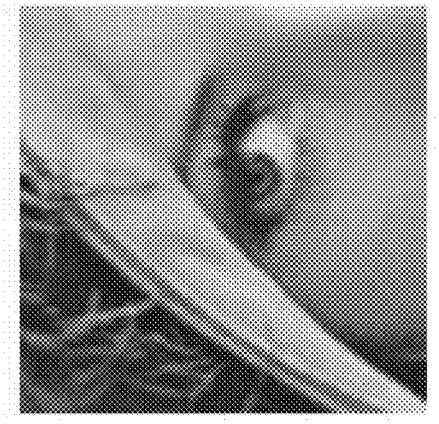
FIG. 1A is an original image for comparing different impulse noise models.
Figure 1B:
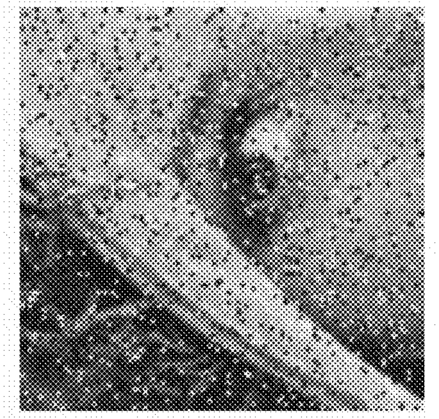
FIG. 1B is corrupted with noise model-1.
Figure 1C:
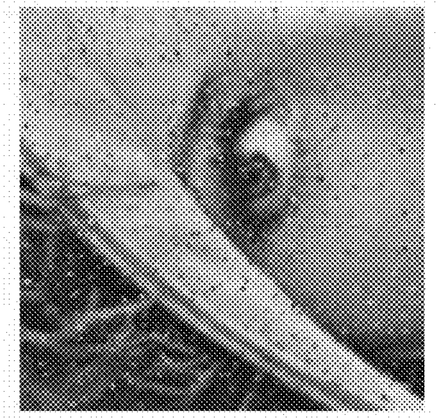
FIG. 1C is corrupted with noise model-2.
Figure 1D:
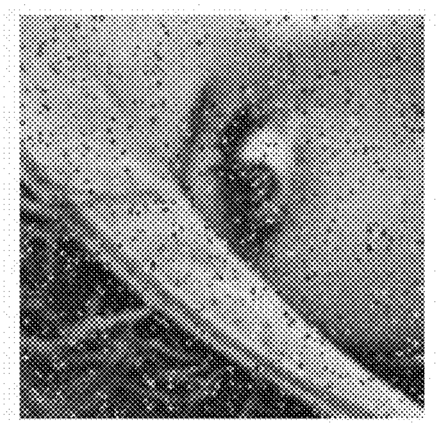
FIG. 1D is corrupted with noise model-3.

FIGS. 1A-D compare different impulse noise models. FIG. 1A is an original image; FIG. 1B is corrupted with the noise model-1; FIG. 1C is corrupted with the noise model-2; FIG. 1D is corrupted with the noise model-3. The probability is set to 10% for all noise models. All testing simulations herein are based on noise model-3.

There are many state-of-the-art developments and publications for impulse noise removal in color images. Similar to gray-scale methods, many have their own advantages and limitations in terms of performance issues, such as edge preserving capability and efficiency on noise removal. One important function used in the gray-scale methods for the median filter is "switching based" median filters. This type of median filters selectively suppress noise pixels leaving those uncorrupted pixels intact. It can preserve the edge details and avoid blurring the image. This mechanism is also used in some versions of the VMF for color images.

The inventive use of Moran's I (statistic) and four one-dimensional Laplacian kernels improves performance on the capability of noise detection which will then be used for noise suppression and removal function. The proposed filter is also a type of filter with a switching mechanism.

Moran's I is one of the oldest indicators of spatial autocorrelation frequently used in social sciences such as geography and sociology. Two research groups have proposed the Moran's I statistic in their work: Chen et al. used the Moran's I statistic for measuring the image quality of reconstructed images, and Huang et al. assume that the byte of a pixel in an image can be divided into two parts, signal and noise; the noise occupies the lower bits of a byte. The Moran's I and join-count statistics are then used to examine the noise bits in order to filter them out.

The invention uses the Moran's I statistic as a measure in a defined window for detecting noise pixels. This motivates measuring the strength of spatial autocorrelation of pixels in the local neighborhood of the image. Moran's I indicates the different spatial structures of the smooth and rough surfaces which provide an index for impulse noise determination and preserve original noise-free pixels.

The classical median filter (MF) is an efficient and common non-linear type filtering algorithm to remove impulse noise in gray-level, color, and multichannel images. The median filter has been widely used due to its distinctive property in the impulse response. Its statistical properties have been analyzed and some modifications and generalizations have been introduced. The median filter is a simple and efficient algorithm which replaces the center pixel with the median value of the corresponding neighborhood window such as a size of 3 by 3. A general MF is formulated as in equation (4)

$$\check{f}(x,y)=\mathrm{med}\{f(x+s,y+t)\ (s,t)\in W)$$
$$\{-\lfloor m/2\rfloor\le s\le+\lfloor m/2\rfloor,-\lfloor m/2\rfloor\le t\le+\lfloor m/2\rfloor\} \quad (4)$$

where $\check{f}$ is the filtered image, (x,y) the location of a pixel, W the neighborhood window in the image, s and t values determined by the window size m and the floor function (i.e. $\lfloor m/2\rfloor$) for integer truncation.

Figure 2:
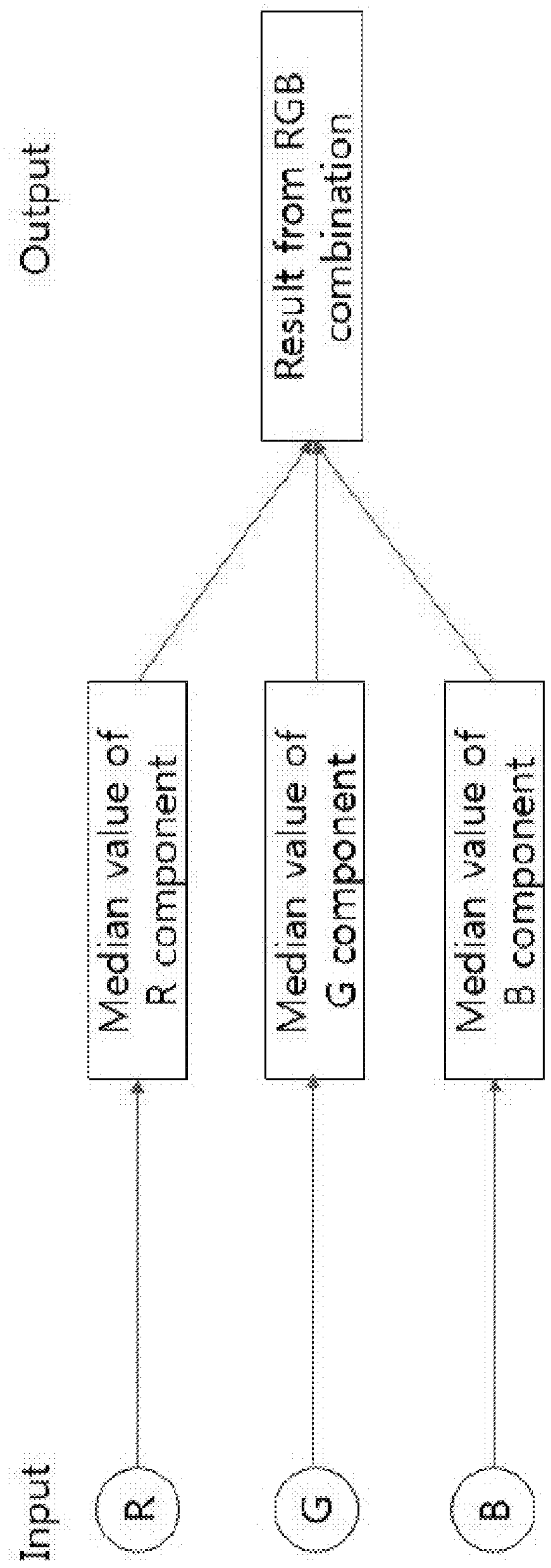
FIG. 2 shows the marginal standard median filtering (MSMF) applies to each component separately.

Although this filtering algorithm was originally developed for the gray-scale image, it can intuitively be used in color images with a component-wise extension. The so-called marginal standard median filter deals with each red, green, and blue (RGB) channel separately, by calculating the median value of each channel within a neighborhood window. The restored image is then constructed by combining all RGB channels together as shown in FIG. 2. A pixel consists of RGB components. The median value of each component is calculated and the output is a new vector with the median value in each of RGB components. Consequently, the filtered pixel will have the median value for each channel as a component in the pixel vector. This filter considers the median value in each separated channel without considering the correlation which may exist between color channels. As a result, the restored image may have color distortion, i.e., artifacts.

Astola et al. proposed a vector median filter (VMF) for impulse noise removal for color images. The VMF is based on ordering the vectors within the neighborhood window by calculating the cumulative pairwise distance and taking the vector corresponding to the lowest-ranked distance as the vector median value for the output. The VMF is formulated as in equation (5) where the norm L can be implemented as either $L_2$ (i.e. Euclidean distance) or other different norms.

$$X_{VMF}=\underset{X_j\in W}{\mathrm{argmin}}\sum_{k=1}^{m}\|X_j-X_k\|_L \quad (5)$$

where $X_j$ ($X_k$) represents a pixel vector in the window and $X_{VMF}$ is the pixel vector with the lowest-ranked distance.

This information reviews two basic filtering algorithms used for impulse noise removal; most state-of-the-art filters have evolved from these two basic filters.

Denoting the marginal standard median filter as MF, because it is an extension of the traditional median filter for color images, the following comparison between the MF and VMF is made for similarities and differences on the filtering performance. While the advantage of the VMF for multichannel data has been noted due to the correlation existing between the multichannel data, in some color images such an advantage may not present. For example, using as an example a 3×3 neighborhood window in a color image with all eight pixels, values are [255, 255, 0] and one noise pixel [0, 255, 255]. Both MF and VMF will have the identical de-noising result. This may be why the MF shows a very competitive result compared with those of VMF in the following experiments based on the PSNR and SSIM measures.

Multiple sample images were tested to compare the de-noising quality and time complexity. To assess the de-noising quality, the Peak Signal-to-Noise Ratio (PSNR) and Structural Similarity Index Metric (SSIM) were used as the quantitative measure. The PSNR is calculated below.

$$PSNR = 10 \times \log\left(\frac{255^2}{MSE}\right) \text{ where} \tag{6}$$

$$MSE = \sum_{i=1}^{M} \sum_{j=1}^{N} \frac{(I_{ij} - \tilde{I}_{ij})^2}{M \times N} \tag{7}$$

and M and N are the width and height of an image, $I_{ij}$ for individual pixel of the noise-free image and $\tilde{I}_{ij}$ is the corresponding pixel of the filtered image. The higher value indicates better de-nosing result. The SSIM measures image quality considering human subjectivity in the context of luminance, contrast, and structural similarity. The comparison between original image x and filtered image y can be calculated using the following equation (8):

$$SSIM(x, y) = \frac{(2\mu_x 2\mu_y + C_1)(2\mu_{xy} + C_2)}{(\mu_x^2 + \mu_y^2 + C_1)(\sigma_x^2 + \sigma_y^2 + C_2)} \tag{8}$$

where $\mu_x$ and $\mu_y$ are average intensities and $\sigma_x$, $\sigma_y$ standard deviations corresponding to images x and y, and $\sigma_{xy}$ for covariance. The values $C_1$ and $C_2$ are constants determined by the dynamic range value.

To conduct a comparison study for MF and VMF, Lena, Pepper, and Baboon images (FIG. 3) have been tested with 5%, 10%, and 15% noise levels. The size of filtering neighborhood window is 3 by 3 and each image with a size of 512 by 512 pixels. In terms of image complexity, the entropy for each image was calculated using equation (9).

$$H(x) = \sum_{i=0}^{L-1} p_i \log_2 p_i \tag{9}$$

where H(X) is the sum of entropy for each gray-level probability pi in the histogram of an image, and L is the maximum gray level for an image. In general, as an image complexity increases, its entropy value also increases.

Figure 3C:
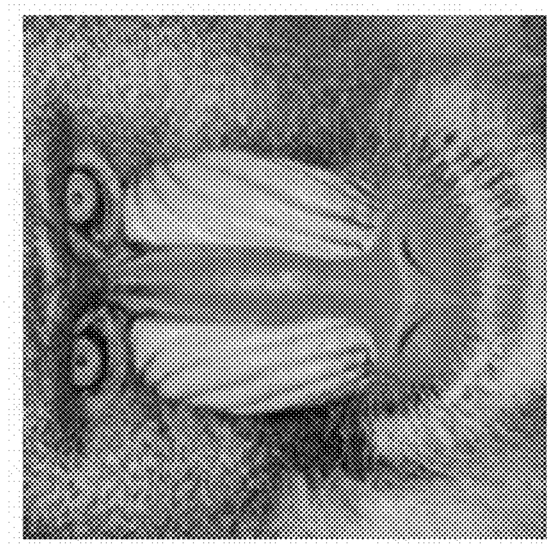
FIG. 3C shows a sample image of a baboon; the image size of each is 512×512.
Figure 3B:
FIG. 3B shows a sample image of Pepper.
Figure 3A:
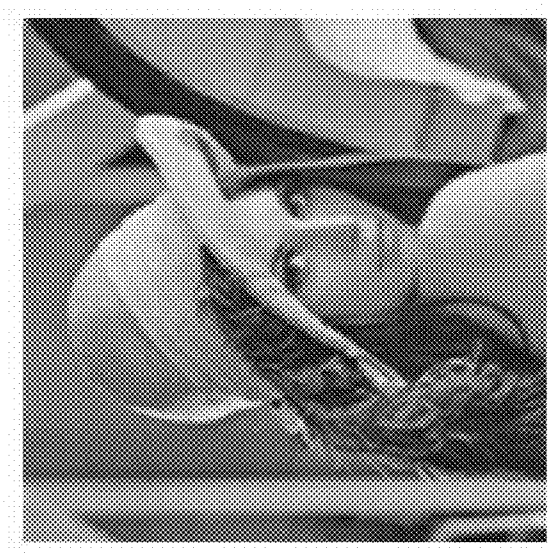
FIG. 3A shows a sample image of Lena.

FIG. 3 shows sample Lena, Pepper, and Baboon (left to right) images tested. The image size is 512×512.

As shown in the empirical study on the MF and VMF, specifically Tables 1, 2, and 3, the overall results from VMF is not significantly different from those of MF. This is particularly illustrated in Table 3 for Baboon image which has the highest entropy among three images. In terms of time complexity, VMF is more than 10 times slower than MF in all test cases. However, VMF is generally considered to be more appropriate for color image processing because it considers inherent correlation between the Red, Green, and Blue color channels of the image and prevents image color distortion. Even with some advantages over MF, the essential problem of slow filtering speed is the major weakness of VMF although some high-speed versions have been proposed. For real-time applications, the VMF time complexity must be improved.

The inventive filter design not only possesses the advantages of the VMF, but also improves its filtering process speed.

Table 1 compares MF and VMF for Lena image with entropy value: 15.12 and s denotes seconds.

| | MF | VMF |
|---|---|---|
| Time Spent | | |
| 5% noise | 0.281 s | 3.67 s |
| 10% noise | 0.288 s | 3.73 s |
| 15% noise | 0.284 s | 3.74 s |
| PSNR | | |
| 5% noise | 28.6 | 28.3 |
| 10% noise | 27.9 | 27.8 |
| 15% noise | 27.0 | 27.2 |
| SSIM | | |
| 5% noise | 0.984 | 0.983 |
| 10% noise | 0.981 | 0.980 |
| 15% noise | 0.976 | 0.977 |

Table 2 compares MF and VMF for peppers image with entropy value: 15.30 and s denotes seconds.

| | MF | VMF |
|---|---|---|
| Time Spent | | |
| 5% noise | 0.27 s | 0.356 s |
| 10% noise | 0.29 s | 0.357 s |
| 15% noise | 0.28 s | 0.360 s |
| PSNR | | |
| 5% noise | 31.4 | 31.4 |
| 10% noise | 30.2 | 30.4 |
| 15% noise | 28.7 | 29.1 |
| SSIM | | |
| 5% noise | 0.990 | 0.982 |
| 10% noise | 0.987 | 0.987 |
| 15% noise | 0.982 | 0.984 |

Table 3 compares MF and VMF for baboon image with entropy value: 15.90 and s denotes seconds.

| | MF | VMF |
|---|---|---|
| Time Spent | | |
| 5% noise | 0.283 s | 3.77 s |
| 10% noise | 0.276 s | 3.78 s |
| 15% noise | 0.299 s | 3.75 s |
| PSNR | | |
| 5% noise | 18.3 | 18.0 |
| 10% noise | 18.0 | 17.8 |
| 15% noise | 17.7 | 17.5 |
| SSIM | | |
| 5% noise | 0.919 | 0.915 |
| 10% noise | 0.911 | 0.906 |
| 15% noise | 0.902 | 0.897 |

Some variations of VMF use different distance measures. The basic vector directional filter (BVDF) utilizes the angle between two pixel vectors within the window. The summation of angular distances used in this filter is calculated below.

$$\alpha_i = \operatorname{argmin}\sum_{j=1}^{9} A(X_i X_j)\ i = 1, 2, 3, \ldots, 9 \tag{10}$$

where A(Xi, Xj) denotes the angle between pixel vectors Xi and Xj by using the arc cosine function from equation (11).

$$A(X_i X_j) = \cos^{-1}\left(\frac{X_i X_j^T}{|X_i||X_j|}\right) \tag{11}$$

The problem with the basic vector median approach is that it can alter some pixels even if there are possibilities that those pixels are actually noise-free. Consequently, the excessive filtering causes blurring effects on the de-noised image. To solve this problem, the center weighted vector median filter (CWVMF) was proposed to use a weight value for the center pixel in the window. This algorithm, however, has a lack of impulse noise detection scheme. Consequently, the adaptive center weighted vector median filter (ACWVMF) was proposed. The main difference between the ACWVMF and other filters introduced so far is that it has noise detection capability, instead of performing noise removal on every pixel. This ACWVMF filter provides a switching mechanism that differentiates between impulse noise and noise-free pixels. In the ACWVMF, the noise detection step which serves as a switching mechanism is based on the concept of aggregated distances assigned to the pixels in the filtering window. The difference between the accumulated distances assigned to the central pixel and to the pixel with the lowest rank serves as an indicator of the noise. If the indicator is greater than (or equal to) a fixed threshold, the output of the ACWVMF is a weighted mean of the central pixel of the filtering window and the vector median of its samples. Otherwise, the pixel is noise-free.

In the inventive algorithm, Moran's I statistic has a better indication than the mechanism used in the ACWVMF for noise or noise-free pixel, demonstrated in FIGS. 14-15, subsequently described.

Figure 4:
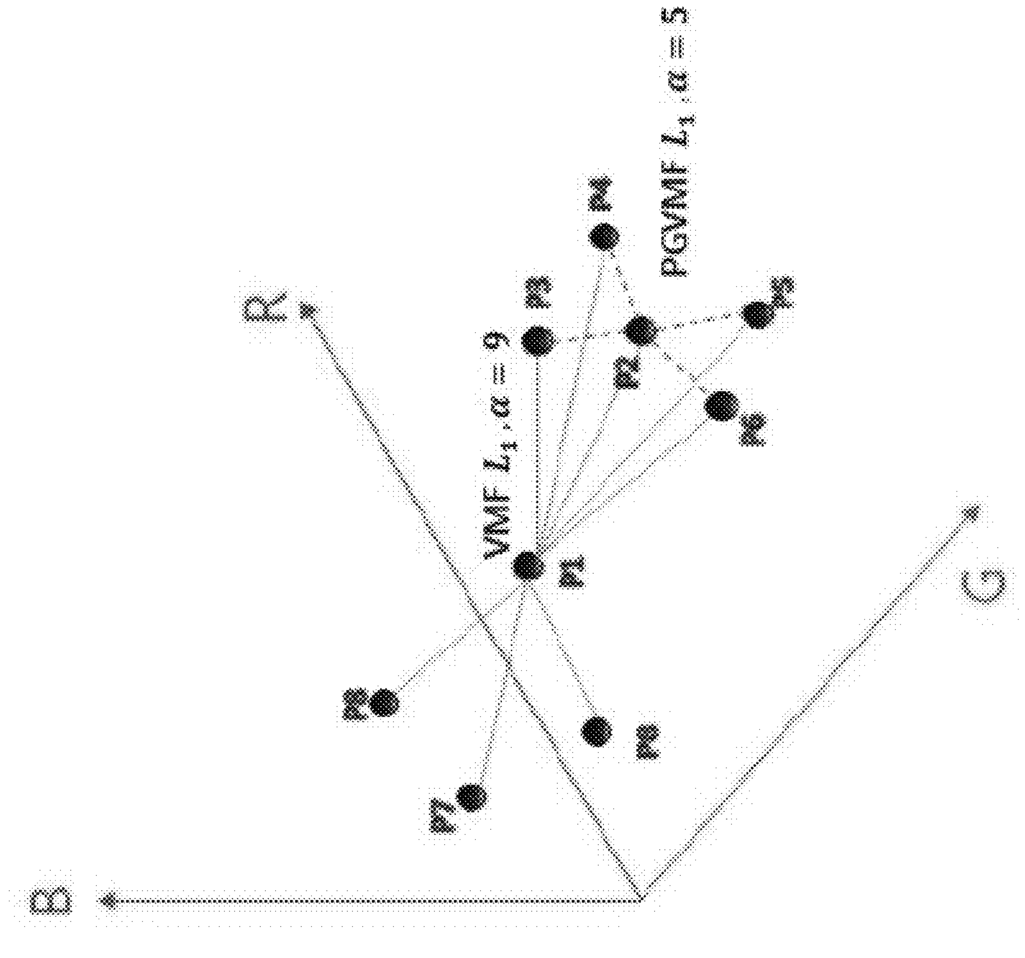
FIG. 4 compares VMF and PGVMF; P1 is the vector median because p1 has the minimum distance from itself to all others with the VMF; for PGVMF, peer group vector median is P2 because alpha α value is 5, P2 is the minimum distance.

The "Peer Group" concept type of filter excludes corrupted pixels in the window to calculate the median vector value. The peer group, in short, is the group of pixels in the filtering window that minimize total sum of distances from the center pixel of the group to adjacent pixels. Therefore, the peer group vector median filter (PGVMF) is based on the trimmed sum of distances. If the number of pixels in the peer group (denoted by α) is equal to 9 in the window size of 3 by 3, it will be identical to the basic VMF algorithm (FIG. 4). The replaced pixel vector is determined by the pixels located within a peer group of pixels, which shows the minimum distance, or minimum dispersion.

FIG. 4 compares VMF and PGVMF. P1 is the vector median because p1 has the minimum distance from itself to all others with the VMF. For PGVMF, peer group vector median is P2 because alpha (α) value is 5, P2 is the minimum distance.

Compared to various filters disclosed, the robust switching vector median filter (RSVMF) has solid noise detection algorithm that enables a filtering process; if a pixel is determined as a noisy pixel, the RSVMF will use the VMF to remove the noise pixel. Otherwise, the pixel value remains unchanged. The RSVMF works similar to VMF except for the following modification:

$$\begin{cases} if d_{center} \leq \alpha \cdot med(d_1, d_2, d_3, \ldots, d_m) \text{ then no filtering} \\ \text{otherwise, the filtering same as in } VMF \end{cases} \tag{12}$$

where m is the total number of pixels in a window, $d_{center}$ cumulative Euclidean distances from the center pixel to pixel 1, 2, . . . m in the window and α a constant value. The med function is to select median value from the cumulative distances of $d_1$, $d_2$, $d_3$, . . . $d_m$ using the method to calculate the cumulative distance as in the VMF.

Another de-noising method is to process vector-based filtering through the trimming scheme. The idea of trimming schemes is to select a group of pixels in the filtering window that may exclude noise pixels through the ranking order. In a sense, this filter is very similar to the PGVMF. However, the RSVMF has some limitation on removing the noise pixels if the noise level is increased to a certain percentage such as 30% noise used in the experiments described herein.

All algorithms disclosed have unique characteristics and limitation to filter impulse noise through vector-based processing. Variations of the disclosed algorithms improve the result in such a way that the filter can preserve edge details and minimize blurring effects.

An efficient algorithm for detection and removal of the random-valued impulse noise in color images based on the fundamental of Moran's I statistics and Laplacian kernels is disclosed. Using a preliminary study on multispectral images shows that this filter is effective in removing impulse noise. The vector-type median filters listed in Table 4 have been tested and compared herein.

TABLE 4

Different filters compared

| Filter Type | Abbreviation |
|---|---|
| Vector Median Filter | VMF |
| Basic Vector Directional Filter | BVDF |
| Center Weighted Vector Median Filter | CWVMF |
| Adaptive Center Weighted Vector Median Filter | ACWVMF |
| Peer Group Vector Median Filter | PGVMF |
| Robust Switching Vector Median Filter | RSVMF |

The inventive algorithm for noise detection and removal in color images consists of three major components: Moran's I for spatial autocorrelation, four 1-D Laplacian kernels, and the VMF Filter. The previous two components are used for noise detection in the algorithm, and the VMF is for de-noising.

Spatial autocorrelation is traced back to the first law of geography: "Everything is related to everything else, but near things are more related than distant things". By definition, spatial autocorrelation is clarified as: "Spatial autocorrelation refers to the fact that the value of a variable at one point in space is related to the value of that same variable in a nearby location". The spatial information concept has been used in pattern recognition and image analysis with different types of formats. Moran introduced Moran's I to check the degree of spatial autocorrelation in areal data. Moran's I is calculated by the following formula and its range is between −1 and +1:

$$\text{Moran's } 1 = mn\sum_{i}^{m}\sum_{j}^{m}\omega_{ij}(y_1-\bar{y})(y_1-\bar{y}) \Big/ \sum_{i}^{m}\sum_{j}^{m}(\omega_{ij})\sum_{j}^{m}(y_1-\bar{y})^2 \tag{13}$$

Here, we assume that there are regions and $\omega_{ij}$ is a measure of the spatial proximity between regions i (with value $y_i$) and j (with value $y_j$). The parameter $\bar{y}$ is the mean value of m regions. The interpretation of I value is categorized into two specific spatial pattern; If the value closes to +1, it indicates a strong homogeneous spatial autocorrelation where local similarity or homogenous spatial patterns exist. A value nearing −1 indicates the strong heterogeneous spatial autocorrelation, but it is a negative pattern that heterogeneous values are grouped together (e.g., a mixture of very high and very low values). This negative spatial autocorrelation is unusual in nature. For example, high income households are not usually located at urban twilight zones. If I value is zero, it means the absence of any strong spatial autocorrelation or no distinct spatial pattern such as checkerboard. The calculation of Moran's I can be exemplified with the a real data in FIG. 5(*a*) which is similar to the example in Ref. 27.

To determine the weight value of $\omega_{ij}$, it is necessary to check the connectivity between regions i and j (i.e. immediate neighbors). For example, region A has connectivity with B and C. Region D has connectivity with B, C, E, and F as shown in FIG. 5(*a*). Hence, a binary connectivity weight matrix (shown in FIG. 5(*b*)) can be constructed corresponding to the data in FIG. 5(*a*).

Figure 5A:
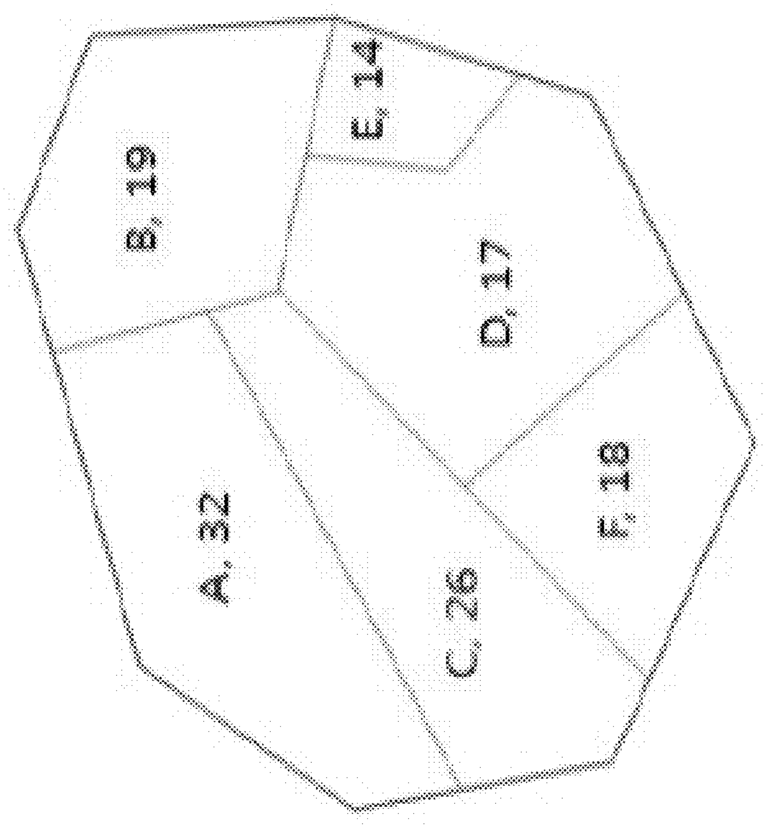
Figure 7A:
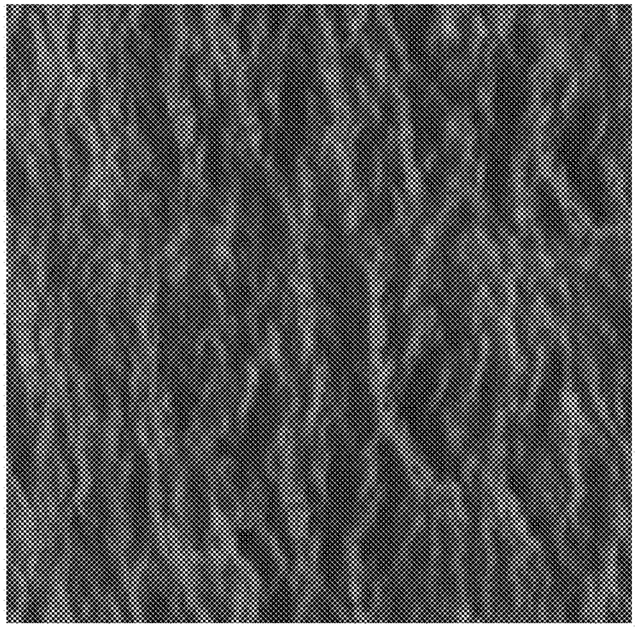
FIGS. 7A-E shows five images: ocean (FIG. 7A), F-16 fighter (FIG. 7B), mountain (FIG. 7C), caster (FIG. 7D), and IC motherboard (FIG. 7C), tested to determine the threshold value for Laplacian Kernels response.
Figure 7B:
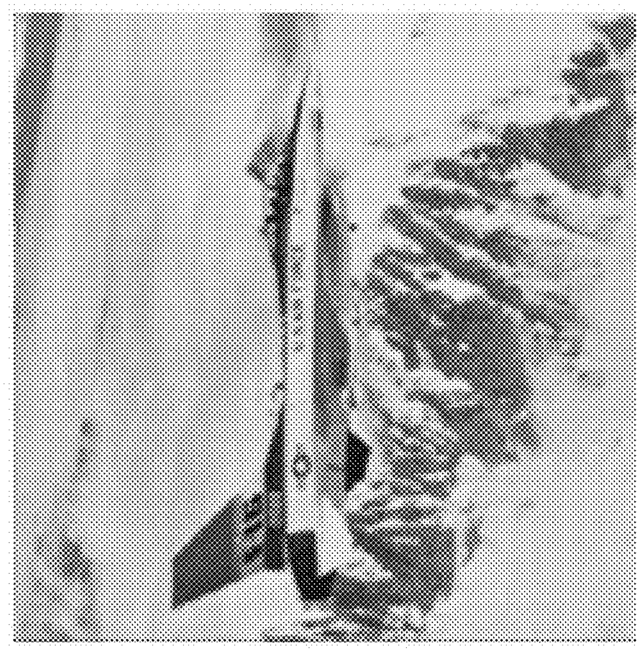
Figure 7C:
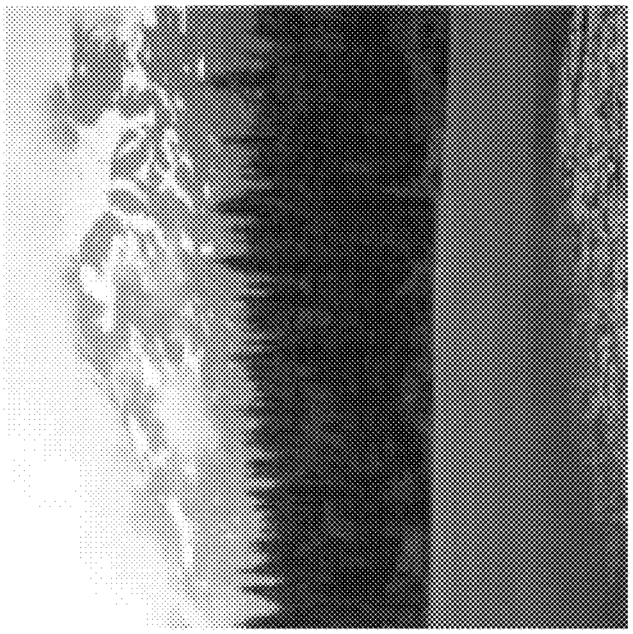
Figure 7D:
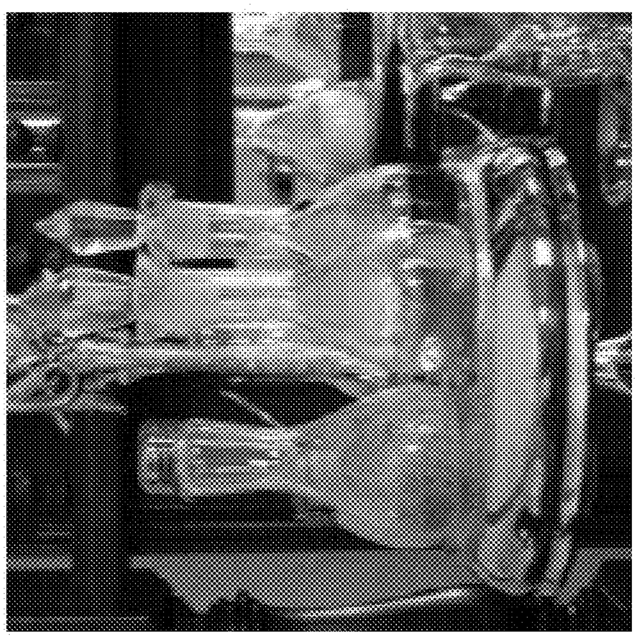
Figure 7E:
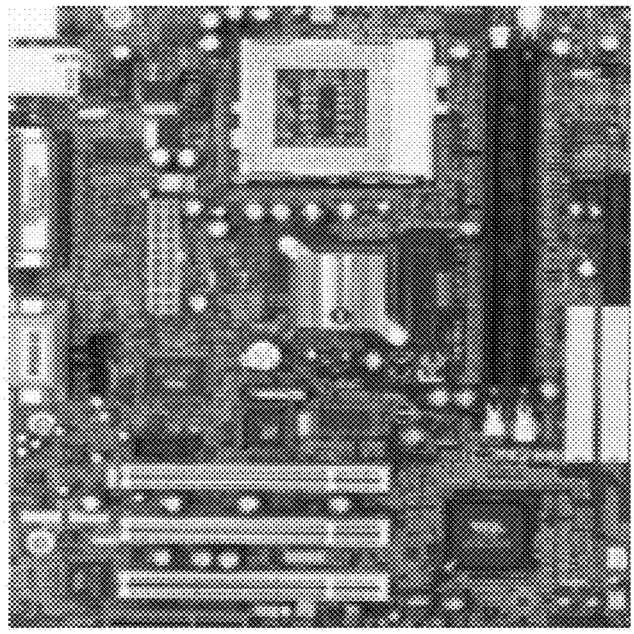

FIG. 5A shows an area of six regions represented by A, B, C, D, E, and F with a value associated with each region. FIG. 5B shows corresponding binary connectivity matrix.

From the denominator of equation (13), $\Sigma^m(y_i-\bar{y})^2$ represents the variance of the regional value. As a result, m is replaced by 6 because there are six regions in FIG. 5A. Moran's I is calculated as (detail omitted):

$$6\sum_{i}^{6}\sum_{j}^{6}\omega_{ij}(y_i-\bar{y})(y_j-\bar{y}) = 6\times 100 \tag{14}$$

-continued $$\sum_{i}^{6}\sum_{j}^{6}(\omega_{ij})\sum_{i}^{6}(y_i\bar{y})^2 = 18\times 244$$

$$\text{Hence, Moran's } 1 = 6(100)/18(244) = 0.1488$$

From the result in equation (14), the I value gives a small positive spatial autocorrelation for the given data.

The implementation of Moran's I for noise detection in color images can be done with the same procedure as shown above. The difference now is that a region used in the previous example will be replaced by a pixel in the filtering window for impulse noise detection. An example is given in Table 5 which shows a 3 by 3 filtering window where the intensity range of a given pixel is between 0 and 255 for an 8-bit color image. Based on the 8-connectivity concept, a weight matrix similar to FIG. 5B is constructed. The weight matrix is given in Table 5; only one channel is shown.

Table 5A is a hypothetical example of 3×3 filtering Window (one channel only), Table 5B is its pixel numbering scheme for the pixels in Table 5A, and Table 5C is the binary connectivity (i.e. adjacency) matrix for Table 5A which shows which pixel is adjacent (marked by 1) to pixel number from 0 to 8. Otherwise, 0 will be used for non-adjacency. For example, for pixel 0, pixels 1, 3, and 4 are adjacent to it.

(A)

$$\begin{Bmatrix} 25 & 25 & 25 \\ 25 & 200 & 25 \\ 25 & 25 & 25 \end{Bmatrix} \text{ for one channel}$$

(B)

| | | |
|---|---|---|
| pixel 0 | pixel 1 | pixel 2 |
| pixel 3 | pixel 4 | pixel 5 |
| pixel 6 | pixel 7 | pixel 8 |

(C)

| Pixel number | 0 | 1 | 2 | 3 | 4 | 5 | 6 | 7 | 8 |
|---|---|---|---|---|---|---|---|---|---|
| 0 | 0 | 1 | 0 | 1 | 1 | 0 | 0 | 0 | 0 |
| 1 | 1 | 0 | 1 | 1 | 1 | 1 | 0 | 0 | 0 |
| 2 | 0 | 1 | 0 | 0 | 1 | 1 | 0 | 0 | 0 |
| 3 | 1 | 1 | 0 | 0 | 1 | 0 | 1 | 1 | 0 |
| 4 | 1 | 1 | 1 | 1 | 0 | 1 | 1 | 1 | 1 |
| 5 | 0 | 1 | 1 | 0 | 1 | 0 | 1 | 1 | 1 |
| 6 | 0 | 0 | 0 | 1 | 1 | 0 | 1 | 1 | 0 |
| 7 | 0 | 0 | 0 | 1 | 1 | 1 | 0 | 0 | 1 |
| 8 | 0 | 0 | 0 | 0 | 1 | 1 | 1 | 1 | 0 |

Based on the weight matrix formulated, for each color channel of RGB, Moran's I, MI, can be calculated to check the degree of spatial autocorrelation. If all MI values from three channels have near +1 value, it can be said that all the pixels in the window are relatively similar. In other words, if any MI value from three channels is close to −1, there is a high probability that impulse noises exist in the filtering window. The threshold value $\varepsilon_0$ for determining the noise area is set up experimentally, as subsequently explained in detail.

By means of a single detector based on Moran's I index, it may not be robust to detect impulse noise precisely. This is because Moran's I is to measure a region's spatial autocorrelation, i.e., Moran's I focuses on all pixels of the filtering window, not the central pixel itself in the window. Hence, it is required to have the next level detector for impulse noise.

The application of Laplacian kernels is one of the precise and simple detecting algorithms for impulse noise. Several median-based impulse noise detectors often misclassify a noise-free pixel into noise category 4,17. In the inventive filter, if only Moran's I is used for the detection, there is a chance that pixels located on the lines and edges can be categorized as impulse noise also.

Given a hypothetical example as shown in FIG. 6B grids (a) and (b) respectively, it is assumed this image patch is a line with a direction in 135 degree. It is also assumed that the patch is identical in three channels. Moran's I value is 0.079 in FIG. 6B grid (a) with the center pixel is noise. Based on the proposed algorithm, if the threshold value $\varepsilon_0$ is set to 0.0, the center pixel will be detected as a noise pixel (MI value is not less than the threshold) and one can progress through the denoising process. However, the minimum response from four 1-D Laplacian kernels is 0. Based on the algorithm in Zhang and Karim, A new impulse detector for switching median filters, IEEE Signal Processing Letters, vol. 9, no. 11, (2002), the response is not considered as a noise pixel since its value is so small (i.e. 0). One reason to set the threshold value T0 greater than 0 is for the response of Laplacian kernels. Hence, Moran's I can overcome the weakness of the 1-D Laplacian kernels in this example. If a line is given as shown in FIG. 6B, Moran's I value is −0.087. Based on the inventive algorithm, if the threshold value $\varepsilon_0$ is set to 0.0, with the second level of detection (i.e. four 1-D Laplacian kernels), it will be detected as a noise-free pixel based on step 4 (the condition $\varepsilon_0$ is satisfied, but the condition T0 is not satisfied). The minimum response from four 1-D Laplacian kernels is 0 (with the 135 degree direction of the 1-D Laplacian kernel), based on the algorithm in the Zheng and Karim publication, the response is not considered as a noise pixel since its value is small, i.e. 0. This center pixel will be considered as a noise-free pixel. Hence, the weakness of Moran's I can be complemented by the four 1-D Laplacian kernels.

In FIG. 6A, four 3 by 3 1-D Laplacian kernels are used experimentally for the second level noise detection. Both 3 by 3 and 5 by 5 1-D Laplacian kernels have been tested simultaneously to verify which size of the kernel is more appropriate for the second level detection. Experimentally, both kernels of different sizes do not show any significantly different results. At the first level of noise pixel detection, the corrupted image is tested through Moran's I index, and then if necessary, four 1-D Laplacian kernels are used in the second level detection. Four 1-D Laplacian kernels are sensitive to edges with four directions. The minimum absolute value from the four kernel operators is chosen as the detection value.

The Laplacian kernel response is denoted as $C_{ij}$ and $\otimes$ is a kernel operator as shown in equation (15).

$$C_{i,j}=\min\{x_{i,j}\otimes K_d : d=1 \text{ to } 4\} \tag{15}$$

where $x_{ij}$ is a pixel and $K_d$ is a Laplacian kernel. Each kernel is applied to choose the minimum absolute value in the window. This value is compared to the threshold (T0) value to determine whether it is a noise pixel or not (equation 16). C is used to represent $C_{ij}$ for the pixel (i,j) in the examination in equation 16. If the value is larger than the threshold, it is an impulse noise. If the value is smaller (or equal) than the threshold, the current pixel is either noise-free, or edge pixel. Determination of this threshold is subsequently disclosed.

$$f(C)=\begin{cases} C > T_0, & \text{Impulse noise} \\ C \le T_0, & \text{Noise-free or edge} \end{cases} \tag{16}$$

From the detection based on Moran's I and Laplacian kernels response, a pixel is either classified as a noise pixel in which the VMF will be called in to remove the noise, or the pixel value remains unchanged.

The remaining issue related to the implementation of MIVMF is determination of the threshold value, because the improper threshold setting can produce unwanted filtering results. First, the threshold value $\varepsilon_0$ for Moran's I should be properly set up to check pixels in the sliding window whether they are located at the noise area or relatively homogenous, noise-free area. Three images, shown in FIG. 3, were chosen to verify the proper threshold value. All three images were tested with different noise level for 5%, 10%, and 15% and the threshold value $\varepsilon_0$ can be properly estimated. If Moran's I is less than $\varepsilon_0$, then the Laplacian kernels will be used to determine if it is a noisy pixel. Otherwise, it is a noise-free pixel.

As shown in Tables 6 and 7, the best threshold value $\varepsilon_0$ is somewhere between −0.1 and 0.1 from the results of PSNR and SSIM. In Table 8, the best threshold value is between −0.2 and 0. This information can be used as an indication for choosing a threshold value for Moran's I index for a color image with different complexity in entropy. Consequently, the promising PSNR and SSIM results from Lena, Peppers, and Baboon images are located around ε0=0. Hence, the threshold value was set as $\varepsilon_0$=0.0 for all images. Further, the difference in the range of possible threshold values for $\varepsilon_0$ is so small such that the selection of this index is not critical to the filtered results.

TABLE 6

Threshold Testing with Lena Image: Entropy 15.12.

| | $\varepsilon_0 = -0.2$ | $\varepsilon_0 = -0.1$ | $\varepsilon_0 = 0.0$ | $\varepsilon_0 = 0.1$ | $\varepsilon_0 = 0.2$ | $\varepsilon_0 = 0.3$ |
|---|---|---|---|---|---|---|
| PSNR | | | | | | |
| 5% noise | 27.49 | **28.95** | 28.77 | 28.58 | 28.40 | 28.34 |
| 10% noise | 23.87 | 27.51 | **27.92** | 27.90 | 27.84 | 27.81 |
| 15% noise | 20.95 | 25.88 | 27.11 | **27.22** | 27.20 | 27.19 |
| SSIM | | | | | | |
| 5% noise | 0.9829 | **0.9854** | 0.9839 | 0.9830 | 0.9825 | 0.9824 |
| 10% noise | 0.9569 | 0.9569 | **0.9806** | 0.9802 | 0.9799 | 0.9799 |
| 15% noise | 0.9138 | 0.9722 | **0.9774** | 0.9771 | 0.9769 | 0.9769 |

TABLE 7

Threshold Testing with Peppers Image: Entropy 15.30.

| | $\varepsilon_0 = -0.2$ | $\varepsilon_0 = -0.1$ | $\varepsilon_0 = 0.0$ | $\varepsilon_0 = 0.1$ | $\varepsilon_0 = 0.2$ | $\varepsilon_0 = 0.3$ |
|---|---|---|---|---|---|---|
| PSNR | | | | | | |
| 5% noise | 28.16 | 31.54 | **31.93** | 31.77 | 31.55 | 31.44 |
| 10% noise | 23.38 | 28.80 | 30.41 | **30.50** | 30.44 | 30.39 |
| 15% noise | 20.48 | 26.19 | 28.80 | **29.11** | 29.10 | 29.10 |
| SSIM | | | | | | |
| 5% noise | 0.9839 | **0.9921** | 0.9913 | 0.9903 | 0.9895 | 0.9891 |
| 10% noise | 0.9520 | 0.9855 | **0.9883** | 0.9879 | 0.9874 | 0.9871 |
| 15% noise | 0.9036 | 0.9727 | 0.9838 | **0.9840** | 0.9838 | 0.9837 |

T

TABLE 8

| Threshold Testing with Baboon Image: Entropy 15.90. | | | | | | |
|---|---|---|---|---|---|---|
| | $\varepsilon_0 = -0.2$ | $\varepsilon_0 = -0.1$ | $\varepsilon_0 = 0.0$ | $\varepsilon_0 = 0.1$ | $\varepsilon_0 = 0.2$ | $\varepsilon_0 = 0.3$ |
| PSNR | | | | | | |
| 5% noise | **19.55** | 18.93 | 18.39 | 18.11 | 17.99 | 17.97 |
| 10% noise | 17.98 | 17.98 | **18.00** | 17.84 | 17.76 | 17.75 |
| 15% noise | 16.66 | **17.67** | 17.65 | 17.56 | 17.52 | 17.51 |
| SSIM | | | | | | |
| 5% noise | **0.9431** | 0.9303 | 0.9205 | 0.9161 | 0.9146 | 0.9144 |
| 10% noise | 0.9175 | **0.9177** | 0.9103 | 0.9069 | 0.9057 | 0.9055 |
| 15% noise | 0.8894 | **0.9041** | 0.9000 | 0.8978 | 0.8972 | 0.8971 |

Figure 8:
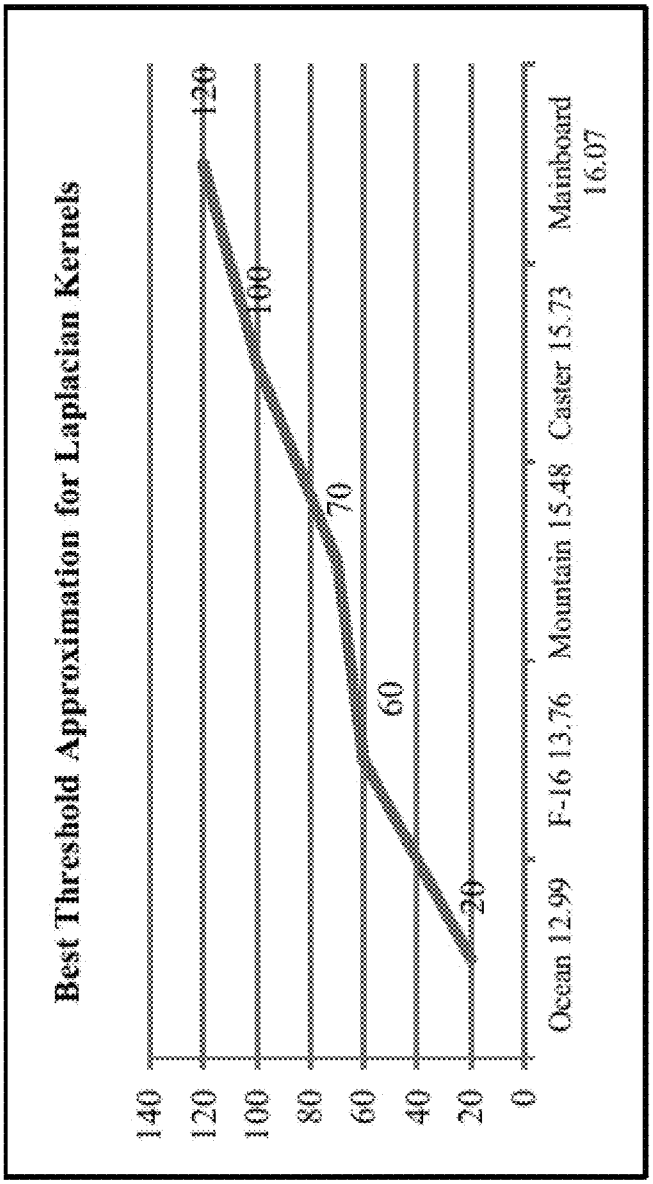
FIG. 8 compares threshold values used in four 1-D Laplacian kernels for images tested.
Figure 9A:
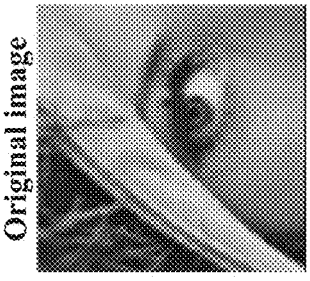
FIGS. 9A-I show filtering results of Lena image of FIG. 3 zoomed at the center area to show filtering result in detail.
Figure 9B:
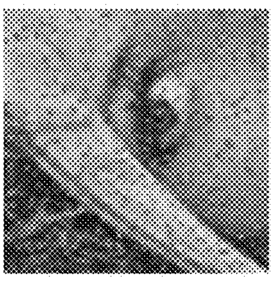
Figure 9C:
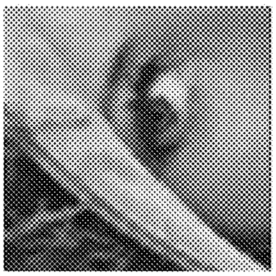
Figure 9D:
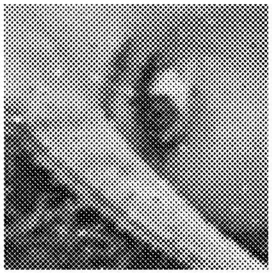
Figure 9E:
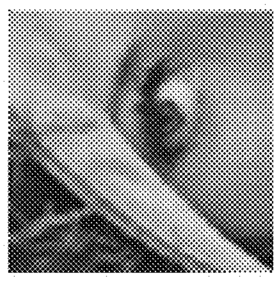
Figure 9F:
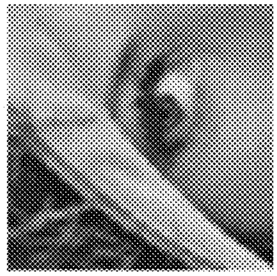
Figure 9G:
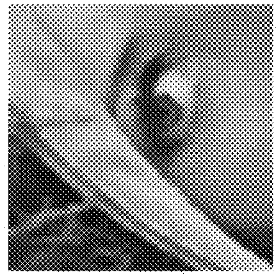
Figure 9H:
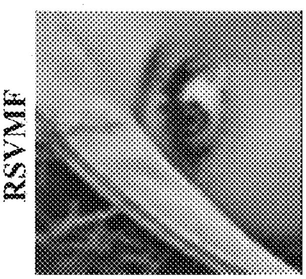
Figure 9I:
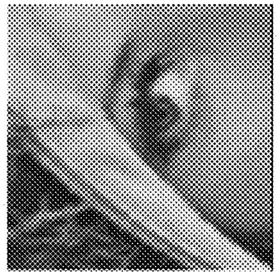
Figure 10A:
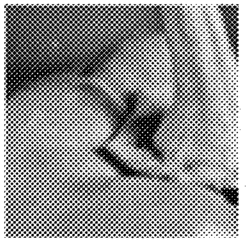
FIGS. 10A-I show filtering results of Pepper image of FIG. 3 zoomed at the center area to show filtering results in detail.
Figure 10B:
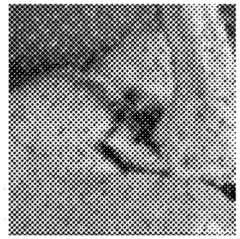
Figure 10C:
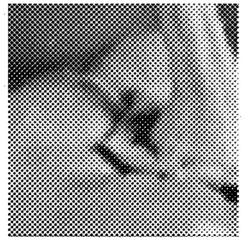
Figure 10D:
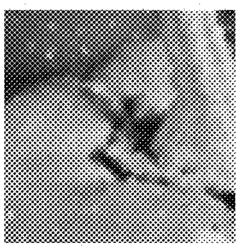
Figure 10E:
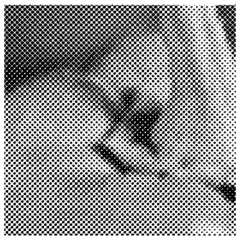
Figure 10F:
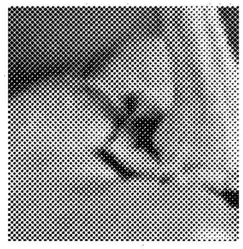
Figure 10G:
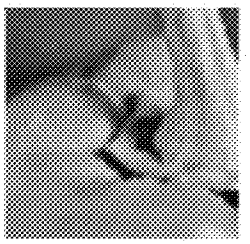
Figure 10H:
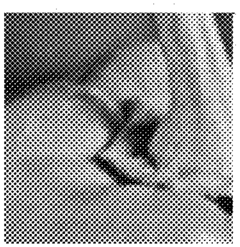
Figure 10I:
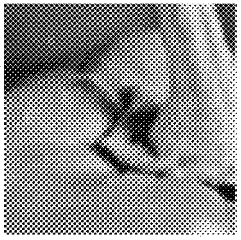
Figure 11A:
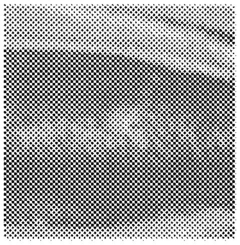
FIGS. 11A-I show filtering results of Baboon image of FIG. 3 zoomed at the center area to show filtering results in detail.
Figure 11B:
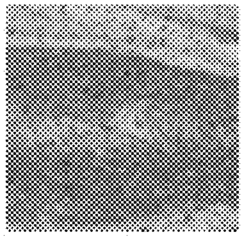
Figure 11C:
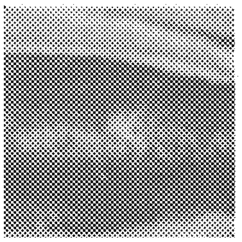
Figure 11D:
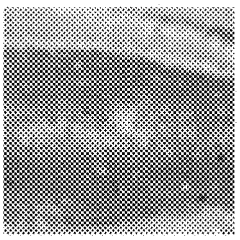
Figure 11E:
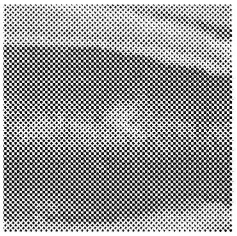
Figure 11F:
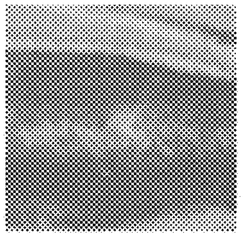
Figure 11G:
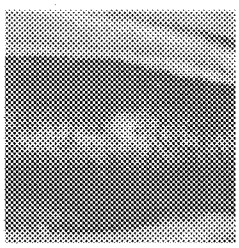
Figure 11H:
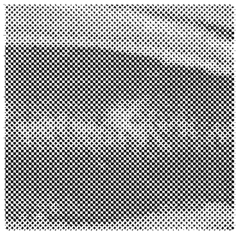
Figure 11I:
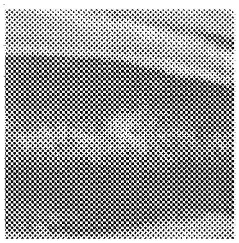

The next threshold to be determined is the response of four 1-D Laplacian kernels. Many images were tested to find out whether there exists any common threshold value which can be used for an image with different complexity. However, such a common threshold value could initially not be found. We then hypothesized that image complexity might be related with the threshold value of Laplacian Kernels. Five images shown in FIG. 7 were chosen with different entropy levels and filtered with various threshold values. On the images tested, the threshold range was between 20 and 120 (FIG. 8). In addition, the noise levels with 5%, 10%, and 15% were tested. In FIG. 8, only Laplacian kernels were used to determine its threshold ($T_0$) for the VMF. For noise levels 10% and 15%, the filtering process was run twice to improve overall outcomes measured by PSNR. For noise level 5%, one filtering was sufficient for removing impulse noise. The number of iterations is noted next to the noise level shown in Tables 9-13.

FIGS. 7A-E shows images Ocean (FIG. 7A), F-16 fighter (FIG. 7B), Mountain (FIG. 7C), Caster (FIG. 7D), and IC motherboard (FIG. 7C), tested to determine the threshold value for Laplacian Kernels response. The image size is 512 by 512 pixels. The entropy, respectively, 12.99, 13.76, 15.48, 15.73, and 16.07.

FIG. 8 is comparison for the threshold values used in four 1-D Laplacian kernels for images tested.

Observing experimental results from Tables 9-13 revealed a trend of the pattern to set up a threshold value for Laplacian kernels response for an image. This trend is to increase the threshold value based on the entropy of an image being de-noised as shown in FIG. 8. Therefore, it is straightforward to calculate the entropy of an image to estimate the threshold value. Based on this assumption, we used the interpolation method for assessing a threshold value for an image being de-noised in our simulation.

Table 9 shows results on Ocean image. The number next to each noise level column shows the number of iterations in the filtering process. The best threshold is bolded.

| Threshold | 5% (1) | 10% (2) | 15% (2) | Total |
|---|---|---|---|---|
| 10 | 45.72 | 42.36 | 39.9 | 127.98 |
| **20** | **45.74** | **42.88** | **40.18** | **128.8** |
| 30 | 44.65 | 42.71 | 40.03 | 127.39 |
| 40 | 43.18 | 42.49 | 39.83 | 125.5 |
| 50 | 41.28 | 42.09 | 39.52 | 122.89 |
| 60 | 39.48 | 40.97 | 38.88 | 119.33 |
| 70 | 38.08 | 39.44 | 37.54 | 115.06 |
| 80 | 36.55 | 37.63 | 35.91 | 110.09 |
| 90 | 35.02 | 35.72 | 34.18 | 104.92 |
| 100 | 33.56 | 33.93 | 32.4 | 99.89 |
| 110 | 32.28 | 32.09 | 30.39 | 94.76 |
| 120 | 31.19 | 30.44 | 28.54 | 90.17 |

-continued

| Threshold | 5% (1) | 10% (2) | 15% (2) | Total |
|---|---|---|---|---|
| 130 | 30.18 | 29 | 26.87 | 86.05 |
| 140 | 29.17 | 27.53 | 25.26 | 81.96 |

Table 10 shows results on F-16 image. The number next to each noise level column shows the number of iterations in the filtering process. The best threshold is bolded.

| Threshold | 5% (1) | 10% (2) | 15% (2) | Total |
|---|---|---|---|---|
| 10 | 30.75 | 28.59 | 27.22 | 86.56 |
| 20 | 32.33 | 29.97 | 28.49 | 90.79 |
| 30 | 33.58 | 31.19 | 29.61 | 94.38 |
| 40 | 34.54 | 32.29 | 30.61 | 97.44 |
| 50 | 35.07 | 33.17 | 31.28 | 99.52 |
| **60** | **34.95** | **33.76** | **31.81** | **100.52** |
| 70 | 34.54 | 33.84 | 31.86 | 100.24 |
| 80 | 33.67 | 33.49 | 31.47 | 98.63 |
| 90 | 32.79 | 32.78 | 30.78 | 96.35 |
| 100 | 31.8 | 31.88 | 29.88 | 93.56 |
| 110 | 30.97 | 30.82 | 28.75 | 90.54 |
| 120 | 30.11 | 29.71 | 27.55 | 87.37 |
| 130 | 29.27 | 28.48 | 26.41 | 84.16 |
| 140 | 28.46 | 27.36 | 25.81 | 81.63 |

Table 11 shows results on Mountain image. The number next to each noise level column shows the number of iterations in the filtering process. The best threshold is bolded.

| Threshold | 5% (1) | 10% (2) | 15% (2) | Total |
|---|---|---|---|---|
| 10 | 28.21 | 26.58 | 25.52 | 80.31 |
| 20 | 29.53 | 27.73 | 26.58 | 83.84 |
| 30 | 30.73 | 28.8 | 27.55 | 87.08 |
| 40 | 31.73 | 29.79 | 28.37 | 89.89 |
| 50 | 32.47 | 30.74 | 29.14 | 92.35 |
| 60 | 32.98 | 31.61 | 29.73 | 94.32 |
| **70** | **33.18** | **32.16** | **30.05** | **95.39** |
| 80 | 32.98 | 32.31 | 30.08 | 95.37 |
| 90 | 32.47 | 32.07 | 29.87 | 94.41 |
| 100 | 31.77 | 31.52 | 29.31 | 92.6 |
| 110 | 31 | 30.72 | 28.62 | 90.34 |
| 120 | 30.3 | 29.8 | 27.79 | 87.89 |
| 130 | 29.6 | 28.69 | 26.75 | 85.04 |
| 140 | 28.69 | 27.7 | 25.69 | 82.08 |

Table 12 shows results on Caster image. The number next to each noise level column shows the number of iterations in the filtering process. The best threshold is bolded.

| Threshold | 5% (1) | 10% (2) | 15% (2) | Total |
|---|---|---|---|---|
| 10 | 23.12 | 21.33 | 20.34 | 64.79 |
| 20 | 24.05 | 22.01 | 20.92 | 66.98 |
| 30 | 24.83 | 22.67 | 21.53 | 69.03 |
| 40 | 25.53 | 23.3 | 22.05 | 70.88 |
| 50 | 26.13 | 23.88 | 22.59 | 72.6 |
| 60 | 26.58 | 24.38 | 23.05 | 74.01 |
| 70 | 26.95 | 24.85 | 23.42 | 75.22 |
| 80 | 27.26 | 25.22 | 23.69 | 76.17 |
| 90 | 27.43 | 25.5 | 23.91 | 76.84 |
| **100** | **27.5** | **25.53** | **23.96** | **76.99** |
| 110 | 27.53 | 25.55 | 23.88 | 76.96 |
| 120 | 27.35 | 25.3 | 23.57 | 76.22 |
| 130 | 27.01 | 24.91 | 23.13 | 75.05 |
| 140 | 26.58 | 24.4 | 22.58 | 73.56 |

Table 13 shows results on IC motherboard image. The number next to each noise level column shows the number of iterations in the filtering process. The best threshold is bolded.

| Threshold | 5% (1) | 10% (2) | 15% (2) | Total |
|---|---|---|---|---|
| 10 | 16.18 | 15.24 | 14.65 | 46.07 |
| 20 | 16.93 | 15.58 | 14.94 | 47.45 |
| 30 | 17.59 | 16 | 15.26 | 48.85 |
| 40 | 18.21 | 16.45 | 15.63 | 50.29 |
| 50 | 18.89 | 16.97 | 16.06 | 51.92 |
| 60 | 19.6 | 17.55 | 16.56 | 53.71 |
| 70 | 20.37 | 18.18 | 17.08 | 55.63 |
| 80 | 21.19 | 18.86 | 17.64 | 57.69 |
| 90 | 21.98 | 19.52 | 18.16 | 59.66 |
| 100 | 22.72 | 20.16 | 18.57 | 61.45 |
| 110 | 23.24 | 20.61 | 18.87 | 62.72 |
| **120** | **23.45** | **20.82** | **19** | **63.27** |
| 130 | 23.51 | 20.8 | 18.91 | 63.22 |
| 140 | 23.35 | 20.57 | 18.62 | 62.54 |

The inventive de-noising algorithm (MIVMF) is summarized as follows. The algorithm may be repeated if needed, i.e., the output from the first pass of the algorithm becomes the input for the second pass, and so on.

| Algorithm: Moran's I Vector Median Filter (MIVMF) |
|---|
| Step 1: Read in a noise color image and set threshold values $\varepsilon_0$ and $T_0$. (Selection of threshold values $\varepsilon_0$ and $T_0$ disclosed previously and in Table 14) |
| Steps 2 to 5 are repeated for each pixel in the image for each iteration. |
| Step 2: Calculate Moran's/value (i.e. MI) in the neighborhood of the pixel within the defined filtering window for each color component of the color image. |
| Step 3: Evaluate the four 1-D Laplacian kernel response values in the neighborhood of the pixel and select the minimum kernel response value (i.e. Min) for each color component of the color image. |
| Step 4: If any MI value from all three color components is less than $\varepsilon_0$ ($1^{st}$ level detection), and if the Min value from all three color components is larger than $T_0$ ($2^{nd}$ level detection), go to Step 5 (for de-noising). Otherwise, go to Step 2 (it is a noise free pixel). |
| Step 5: Use the VMF for removing noise, and then go to Step 2. |

To evaluate the performance of the proposed algorithm and compare with other well-developed de-noising filters, we tested all the filters listed in Table 4. Various test parameters including the filtering window size and threshold values are listed in Table 14. All test conditions except the inventive filter are based on the literature suggested parameter values. The size of neighborhood window used for all filters was 3×3. To compare the de-noising performance, PSNR, SSIM, and time complexity measured in microseconds are calculated for this purpose. Three images from FIG. 3 are used in the experiments. Some de-noised images are shown in FIGS. 9-12. In the noise level 10% and 15%, both RSVMF and MIVMF were run twice to obtain the best outcome measured by PSNR. Other filters were run only once; otherwise, the image will be blurred if run more than once). For the repetition, the output from the first pass of the algorithm becomes the input for the second pass and so on.

Table 14 shows additional parameters for filters used.

TABLE 14

| Filters | Extra parameters used besides 3 × 3 window |
|---|---|
| CWVMF | Center weight = 4 |
| ACWVMF | $\lambda = 2$, $\tau = 2$, Threshold = 80 |
| PGVMF | $\alpha = 6$ |

TABLE 14-continued

| Filters | Extra parameters used besides 3 × 3 window |
|---|---|
| RSVMF | $\alpha = 1.25$ for light noise, $\alpha = 1.5$ for heavy noise |
| Proposed | 3 × 3 window size, Laplacian Kernel Threshold value, $T_0$ is interpolated based on the image complexity with entropy measure as shown in FIG. 10 Moran's/Threshold $\varepsilon_0 = 0.0$ |

FIG. 9 Filtering results of Lena image. To see the filtering result in detail, it has been zoomed at the center area. (a) an original image, (b) 15% impulse noise added, and (c), (d), (e), (f), (g), (h), and (i) are results of VMF, BVDF, CWVMF, ACWVMF, PGVMF, RSVMF and MIVMF (i.e. our proposed filter), respectively.

FIG. 10 Filtering results of Peppers image. To see the filtering result in detail, it has been zoomed at the center area. (a) an original image, (b) 15% impulse noise added, and (c), (d), (e), (f), (g), (h), and (i)

FIG. 11 shows filtering results of Baboon image. To see the filtering result in detail, it has been zoomed at the center area. (a) an original image, (b) 15% impulse noise added, and (c), (d), (e), (f), (g), (h), and (i) are results of VMF, BVDF, CWVMF, ACWVMF, PGVMF, RSVMF, and the inventive MIVMF, respectively.

Figure 12A:
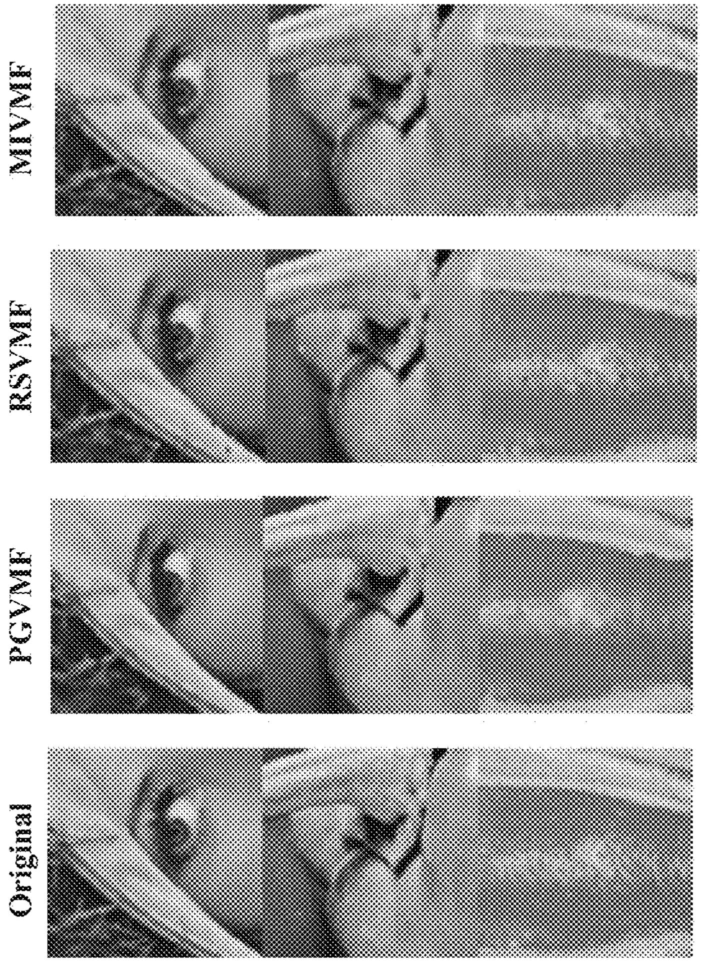
FIG. 12A shows specific filtering results of 30% noise added for Lena, Pepper, and baboon image comparison among PGVMF, RSVMF and MIVMF (i.e. the inventive filter) zoomed at the center area to show filtering result in detail and each filter repeated three times to obtain the result; three original images are shown in the first column, results of PGVMF are shown in the second column, the results of RSVMF are shown in the third column, results of MIVMF are shown in the last column.
Figure 12B:
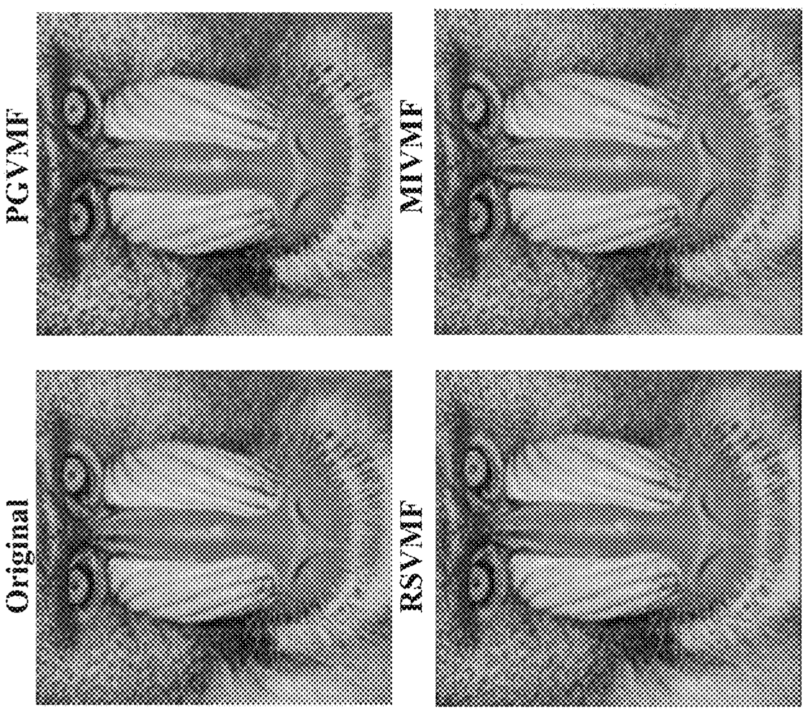
FIG. 12B shows the entire Baboon image to illustrate the de-noising effect of PGVMF, RSVMF and MIVMF, noting that the filtered result by PGVMF is distorted, in particular, the moustache of the baboon becomes very thick.

FIG. 12A shows specific filtering results of 30% noise added cases for the comparison among PGVMF, RSVMF, and the inventive filter MIVMF. To see the filtering result in detail, it has been zoomed at the center area. Three original images are shown in the first column. The second column shows results of PGVMF. The third column shows results of RSVMF. The last column shows results of MIVMF. FIG. 12B shows the entire Baboon image to illustrate the de-nosing effect of PGVMF, RSVMF, and MIVMF. It is clear that the filtered result by PGVMF is distorted, in particular, the moustache of the Baboon become very thick. Each filter was repeated three times to obtain the result.

In our experiments, there was no significant difference for a filter in terms of the time complexity for processing an image with any noise level or image complexity based on the entropy measure. This can be seen from Tables 15-17. The proposed MIVMF was best among all the filters tested with the PSNR measure. For the SSIM measure which is for human eye perception, all the filters are almost identical, except that BVDF is degrading when the noise level is increased.

On the contrary, for an image with medium entropy such as Peppers image, the PSNR measure for all filters is decreasing when the noise level is increased, as shown in Table 16. This phenomenon is also shown in the SSIM measure for the BVDF. Otherwise, the SSIM is very similar for all the filters tested. The inventive MIVMF had the best PSNR measure for an image with low, medium, and high entropy. For images with higher entropy, there exists a trend for all filters that the SSIM is decreasing when the noise level is increasing, except for the VMF in which the 15% noise shows a high SSIM value as shown in Table 17. In terms of the PSNR measure, all of the filters tested decrease if the image complexity is increased. However, the MIVMF has an overall the highest PSNR value at different noise levels and almost with any complexity of images measured in entropy.

Table 15 below shows results of Lena with entropy 15.12 and T0=67 in 5%, 10% and 15% noise levels; s denotes seconds.

| | VMF | BVDF | CWVMF | ACWVMF | PGVMF | RSVMF | MIVMF |
|---|---|---|---|---|---|---|---|
| Time spent | | | | | | | |
| 5% | 3.67 s | 7.79 s | 3.68 s | 11.72 s | 4.44 s | 3.88 s | 1.26 s |
| 10% | 3.68 s | 7.64 s | 3.70 s | 11.64 s | 4.48 s | 7.72 s | 2.53 s |
| 15% | 3.69 s | 7.65 s | 3.70 s | 11.79 s | 4.48 s | 7.76 s | 2.78 s |
| PSNR | | | | | | | |
| 5% | 28.34 | 24.92 | 27.60 | 29.94 | 26.99 | 34.52 | **34.85** |
| 10% | 27.81 | 22.59 | 27.12 | 29.06 | 26.89 | 32.40 | **32.99** |
| 15% | 27.19 | 20.41 | 26.58 | 28.16 | 26.75 | 30.11 | **30.93** |
| SSIM | | | | | | | |
| 5% | 0.9824 | 0.9515 | 0.9806 | 0.9907 | 0.9782 | 0.9947 | **0.9971** |
| 10% | 0.9799 | 0.9061 | 0.9780 | 0.9879 | 0.9773 | 0.9898 | **0.9954** |
| 15% | 0.9769 | 0.8524 | 0.9750 | 0.9849 | 0.9772 | 0.9881 | **0.9926** |

In 10% noise, the MIVMF was run two iterations which require 1.48 s and 1.05 s (2.53 s total) for 1st and 2nd iteration, respectively. Similarly for 15%, it took 1.71 s and 1.07 s (2.78 s total). For RSVMF, MIVMF was run two iterations for 10% and 15%. For 10% noise, it took 3.87 s and 3.85 s (7.72 s total). For 15%, it took 3.96 s and 3.80 s (7.76 s total).

Table 16 show test results of Peppers with Entropy 15.30 and T0=68 in 5%, 10% and 15% noise levels. s denotes seconds.

| | VMF | BVDF | CWVMF | ACWVMF | PGVMF | RSVMF | MIVMF |
|---|---|---|---|---|---|---|---|
| Time spent | | | | | | | |
| 5% | 3.53 s | 7.66 s | 3.53 s | 10.76 s | 4.32 s | 3.70 s | 1.19 s |
| 10% | 3.55 s | 7.60 s | 3.55 s | 11.07 s | 4.33 s | 7.36 s | 2.38 s |
| 15% | 3.57 s | 7.63 s | 3.57 s | 11.42 s | 4.43 s | 7.39 s | 2.65 s |
| PSNR | | | | | | | |
| 5% | 31.44 | 26.19 | 30.12 | 32.03 | 29.03 | 35.76 | **35.50** |
| 10% | 30.39 | 23.00 | 29.34 | 30.84 | 28.91 | 33.78 | **33.88** |
| 15% | 29.11 | 19.97 | 28.31 | 29.42 | 28.62 | 31.28 | **31.84** |
| SSIM | | | | | | | |
| 5% | 0.9891 | 0.9583 | 0.9878 | 0.9955 | 0.9853 | 0.9970 | **0.9974** |
| 10% | 0.9871 | 0.9058 | 0.9858 | 0.9937 | 0.9851 | 0.9939 | **0.9969** |
| 15% | 0.9837 | 0.8228 | 0.9822 | 0.9901 | 0.9844 | 0.9927 | **0.9947** |

In 10%, the MIVMF took 1.43 s and 0.95 s (2.38 s total) for 1st and 2nd iteration, respectively. For 15%, it spent 1.66 s and 0.99 s (2.65 s total). For RSVMF with 10%, it took 3.73 s and 3.63 s (7.36 s total). For 15%, it took 3.75 s and 3.64 s (7.39 s total).

Table 17 shows test results of Baboon with entropy 15.90 and $T_0$=109 in 5%, 10% and 15% noise levels. s denotes seconds.

| | VMF | BVDF | CWVMF | ACWVMF | PGVMF | RSVMF | MIVMF |
|---|---|---|---|---|---|---|---|
| Time spent | | | | | | | |
| 5% | 3.81 s | 7.79 s | 3.68 s | 12.93 s | 4.49 s | 3.98 s | 1.25 s |
| 10% | 3.72 s | 7.65 s | 3.77 s | 13.11 s | 4.49 s | 7.77 s | 2.47 s |
| 15% | 3.73 s | 7.65 s | 3.72 s | 13.19 s | 4.47 s | 7.76 s | 2.70 s |
| PSNR | | | | | | | |
| 5% | 17.98 | 14.88 | 17.70 | 17.92 | 17.29 | 24.29 | **25.77** |
| 10% | 17.76 | 14.53 | 17.48 | 17.68 | 17.24 | 21.91 | **23.30** |
| 15% | 17.52 | 14.12 | 17.24 | 17.41 | 17.14 | 20.49 | **21.70** |
| SSIM | | | | | | | |
| 5% | 0.9144 | 0.8125 | 0.9103 | 0.9171 | 0.8993 | 0.9823 | **0.9876** |
| 10% | 0.9055 | 0.7900 | 0.9012 | 0.9078 | 0.8968 | 0.9664 | **0.9767** |
| 15% | 0.9871 | 0.7598 | 0.8925 | 0.8988 | 0.8937 | 0.9563 | **0.9639** |

In 10% noise, the proposed MIVMF took 1.42 s and 1.05 s (2.47 s total) for 1st and 2nd iteration, respectively. For 15%, it spent 1.60 s and 1.10 s (2.70 s total). For RSVMF with 10%, it took 3.89 s and 3.89 s (7.77 s total). For 15%, it took 3.90 s and 3.86 s (7.76 s total).

Based on the results shown in Tables 15-17, there is only slight difference on the performance of RSVMF and MIVMF for the low noise-level. Hence, to measure effectiveness of RSVMF and MIVMF for heavy noises, both filters were tested on 20%, 25%, and 30% noise levels on three images, with results shown in Tables 18-20. Results are from three iterations of each filter and overall time spent is the sum of three iterations. Test threshold ($\alpha$) for RSVMF is 1.5 based on Ref. 12. While the SSIM was similar for both filters, the proposed MIVMF had better PSNR measure with the higher noise level. The MIVMF had overall the highest PSNR value in those noise levels. In addition, the running time for the MIVMF was less than half of the RSVMF.

Table 18 compares RSVMF and MIVMF on Heavy Noise Added Lena Image. s denotes seconds.

| | RSVMF | MIVMF |
|---|---|---|
| Time spent | | |
| 20% noise | 11.37 s | 4.20 s |
| 25% noise | 11.37 s | 4.48 s |
| 30% noise | 11.35 s | 4.71 s |
| PSNR | | |
| 20% noise | 28.34 | 29.46 |
| 25% noise | 26.72 | 28.22 |
| 30% noise | 24.37 | 26.85 |
| SSIM | | |
| 20% noise | 0.9869 | 0.9881 |
| 25% noise | 0.9802 | 0.9828 |
| 30% noise | 0.9649 | 0.9732 |

Table 19 compares RSVMF and MIVMF on Heavy Noise Added Peppers Image. s denotes seconds.

| | RSVMF | MIVMF |
|---|---|---|
| Time spent | | |
| 20% noise | 10.98 s | 3.99 s |
| 25% noise | 10.95 s | 4.26 s |
| 30% noise | 11.05 s | 4.58 s |
| PSNR | | |
| 20% noise | 29.40 | 30.27 |
| 25% noise | 26.75 | 28.70 |
| 30% noise | 24.48 | 27.31 |
| SSIM | | |
| 20% noise | 0.9896 | 0.9916 |
| 25% noise | 0.9859 | 0.9862 |
| 30% noise | 0.9707 | 0.9788 |

Table 20 compares RSVMF and MIVMF on Heavy Noise Added Baboon Image. s denotes seconds.

| | RSVMF | MIVMF |
|---|---|---|
| Time spent | | |
| 20% noise | 11.51 s | 4.11 s |
| 25% noise | 11.57 s | 4.32 s |
| 30% noise | 11.58 s | 4.55 s |

-continued

| | RSVMF | MIVMF |
|---|---|---|
| PSNR | | |
| 20% noise | 19.18 | 20.47 |
| 25% noise | 17.98 | 19.49 |
| 30% noise | 16.66 | 18.49 |
| SSIM | | |
| 20% noise | 0.9402 | 0.9496 |
| 25% noise | 0.9217 | 0.9328 |
| 30% noise | 0.8984 | 0.9104 |

Figure 13A:
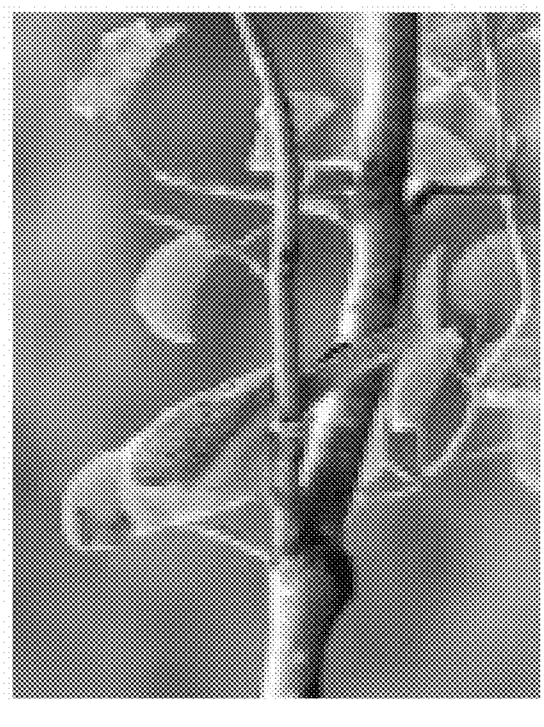
FIGS. 13A-C shows three images of parrot with 255×197 pixels, entropy 15.25, 0.0 for $\varepsilon_0$ (FIG. 13A), penguin with 1024×768 pixels, entropy 15.40, 0.0 for $\varepsilon_0$ (FIG. 13B), and koala with 1024×768 pixels, entropy 16.18, 0.0 for $\varepsilon_0$ (FIG. 13C); by using the interpolation method shown in FIG. 8, threshold values of $T_0$ for FIG. 13A is 79, for FIG. 13B is 78, and for FIG. 13C is 120.
Figure 13B:
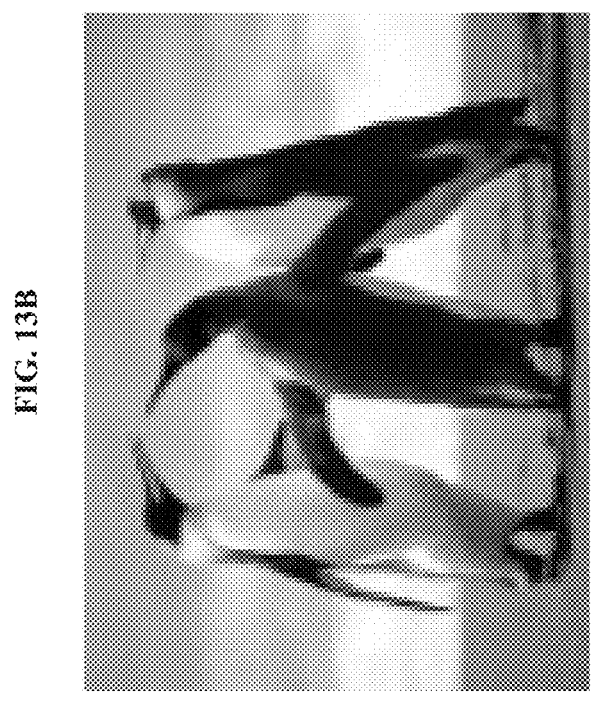
Figure 13C:
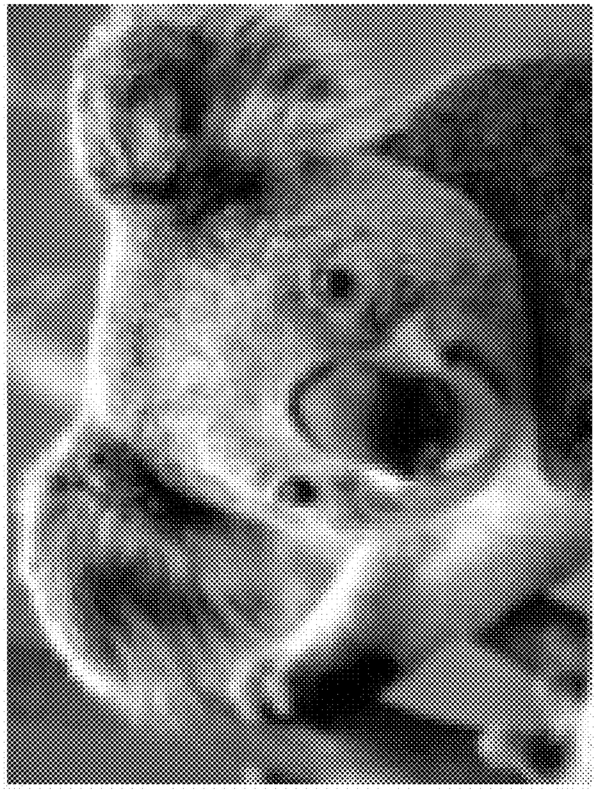

To further demonstrate the effectiveness of the inventive algorithm in de-noising, different images were tested and a number of iterations for each filter listed in Table 14 were performed. Images tested are shown in FIG. 13 which includes Parrot (entropy 15.25), Penguin (entropy 15.40), and Koala images (entropy 16.18). As in Table 14, 0.0 for Moran's I threshold $\varepsilon_0$ was used and threshold $T_0$ was interpolated based on the image entropy. FIG. 14 shows the filtered results. Bar charts represented the PSNR score for each filter tested. To each image 5% noise was added and each filter was run only once in the experiments. Experimental results show that the inventive algorithm, MIVMF, had the best PSNR scores.

Figure 15A:
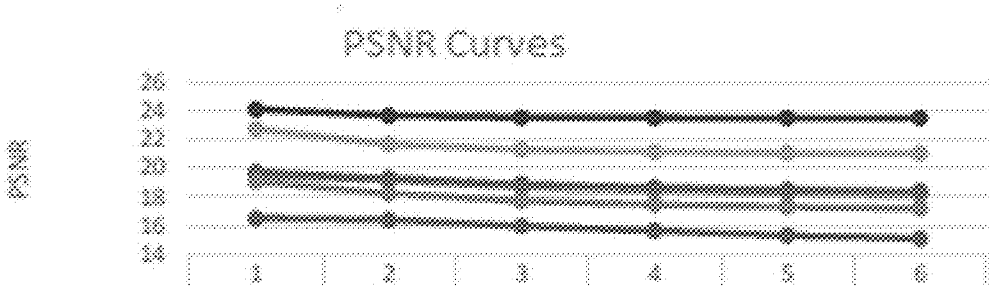
FIGS. 15A-D show the filtered results; the X-axis represents the number of iterations and the Y-axis represents the PSNR values; the PSNRs for different number of iterations and filters are listed in the table.
Figure 15B:
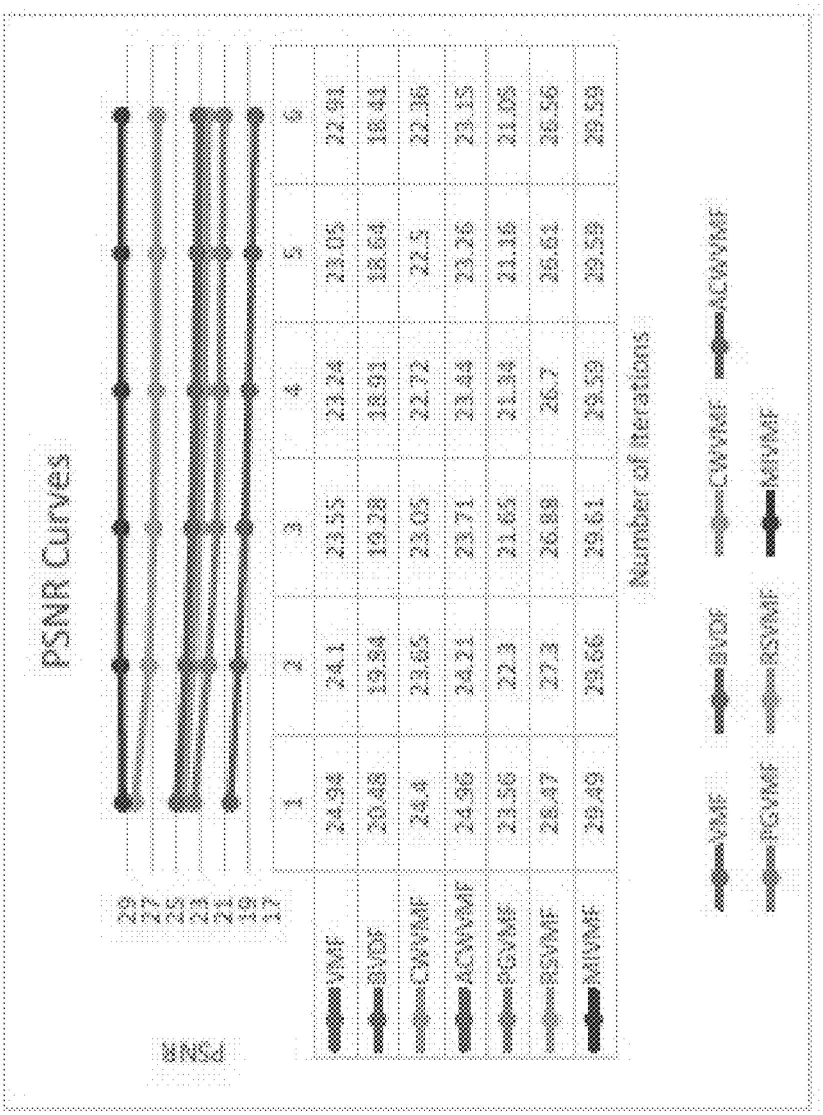
Figure 15C:
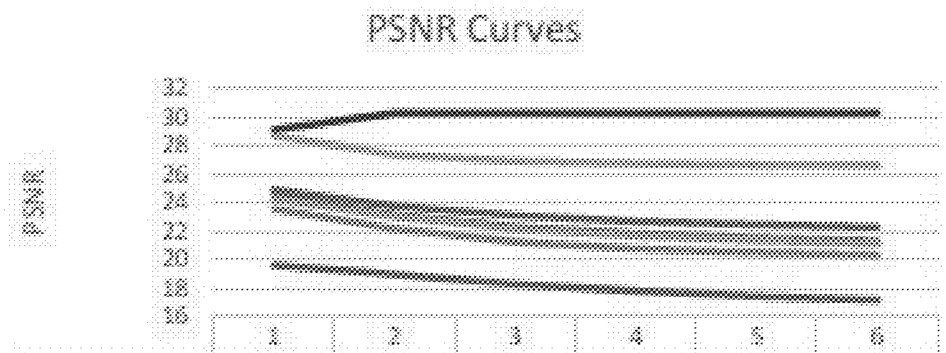
Figure 15D:
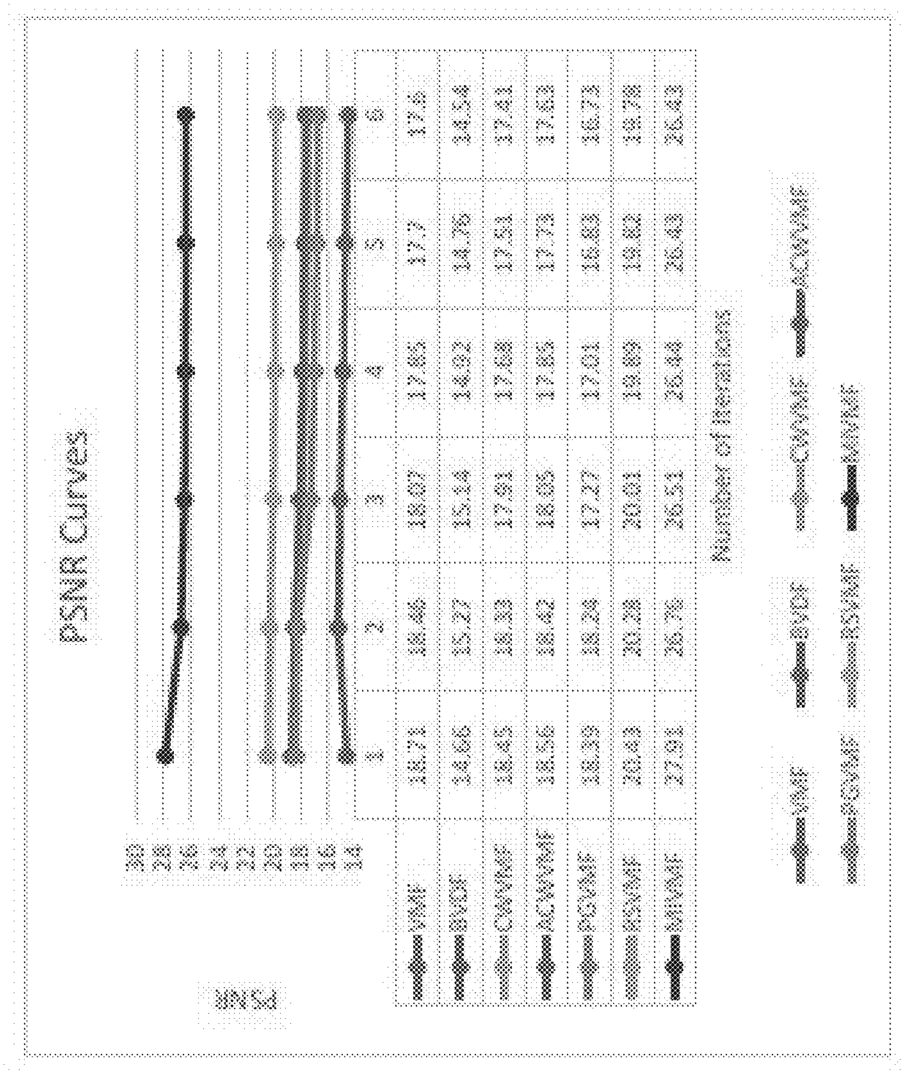

Some filters cause distortion of images and blur the image details if the filter is run multiple times on the image. To test the efficiency of the inventive algorithm, each filter was run with a number of iterations to compare the filtered results. The results were obtained with six iterations for each filter and are shown in FIG. 15. By observing the PSNR curves, all PSNR scores for VMF, BVDF, CWVMF, ACWVMF, PGVMF, and RSVMF are decreasing when the number of iterations is increased. This phenomenon will continue if the filter is iterated again. This indicates that the filtered image was distorted and image details were not preserved. The PSNR scores with the inventive MIVMF either decreased slightly such as shown in FIGS. 15A and 15D, or increased slightly such as shown in FIGS. 15B and 15C. In either case, the MIVMF will reach a saturation state and its PSNR score will not change again. For example, in FIGS. 15A and 15D, the PSNR of the MIVMF will stay in 23.57 and 26.43, respectively, no matter how many more iterations will be repeated. Similarly, in FIGS. 15B and 15C, the PSNR will stay in 29.59 and 30.33, respectively. This important characteristic shows that the MIVMF is an efficient filter with the good detection mechanism for determining if a pixel is noise or not. Hence, the image details will not be damaged or blurred. The MIVMF had the highest PSNR value no matter how many iterations were repeated. In addition, the MIVMF ran much faster than other filters, as shown in Tables 15-20.

FIG. 13. Three images, (a) Parrot with 255×197 pixels, (b) Penguin with 1024×768 pixels, and (c) Koala with 1024×768 pixels. The entropy for (a) is 15.25, (b) 15.40, and (c) 16.18. By using the interpolation method shown in FIG. 8, threshold values of $T_0$ for (a) is 79, (b) 78, and (c) 120. 0.0 was used for $\varepsilon_0$ for all experiments.

Figure 14A:
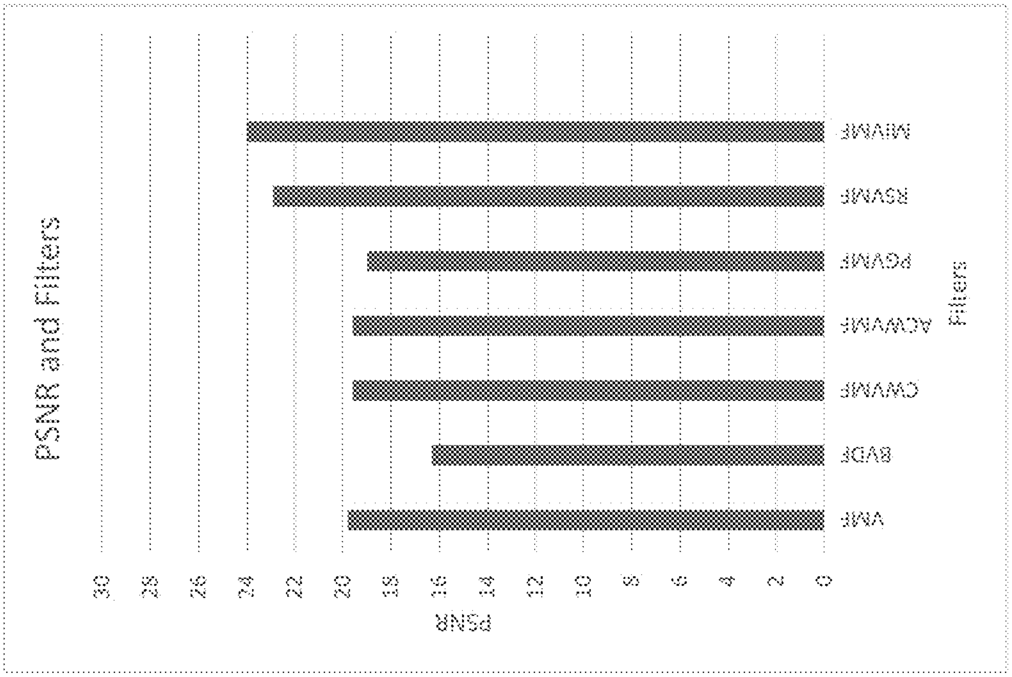
FIGS. 14A-C shows filtered results for parrot (FIG. 14A), penguin (FIG. 14B), and koala (FIG. 14C); to each image 5% noise was added and each filter was run only once.
Figure 14B:
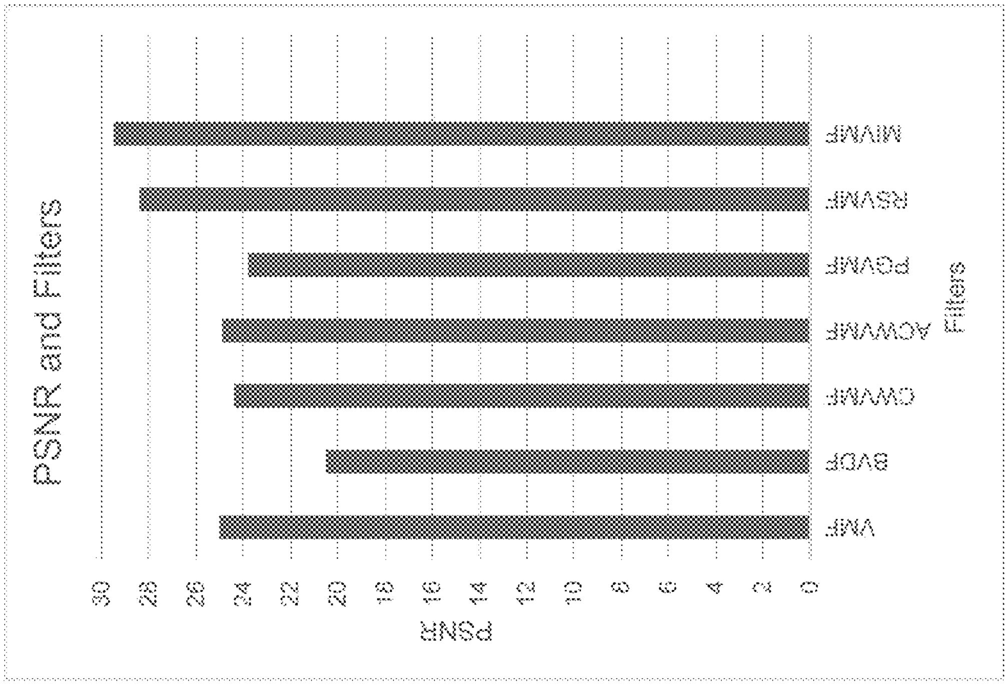
Figure 14C:
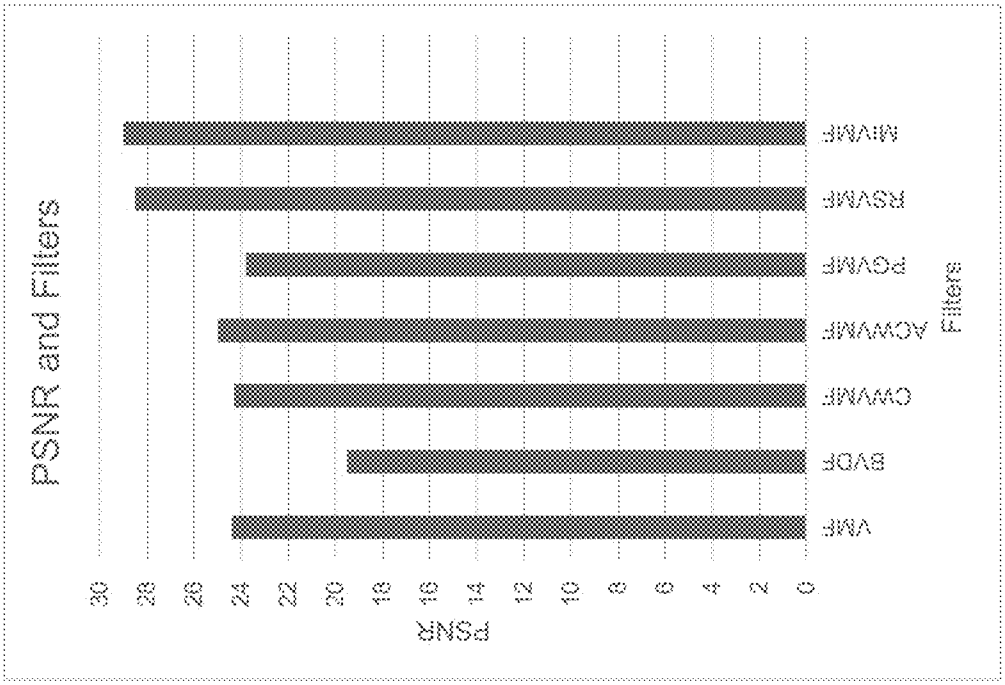

FIG. 14. The bar charts show the filtered results; (a) Parrot, (b) Penguin, and (c) Koala. To each image 5% noise was added and each filter was run only once in the experiment.

FIG. 15. The curves show the filtered results which X-axis represents the number of iterations and Y-axis represents the PSNR values; the PSNRs for different number of iterations and filters are listed in the table; (a) Parrot was corrupted with 5% noise, (b) Penguin with 5% noise, (c) Koala with 5% noise, and (d) Parrot with 15% noise. Each filter was run six times in the experiments and then each PSNR was calculated for each run.

By observing the experimental results in Tables 15-20, FIGS. 9-12 and 14-15, the inventive MIVMF showed a promising result compared with other vector-based filters. The inventive de-noising filter accomplishes better time complexity and efficient de-noising results. The two-level detection function based on Moran's I and 1-D Laplacian kernels works properly so that it reduced processing time and produced better filtered results compared with other similar type of vector-based filters.

In summary, the inventive noise detection and removal filter which uses Moran's I statistics (i.e. MI value) for calculating the spatial autocorrelation indexes and combining with four 1-D Laplacian kernels for random-valued impulse noise detection for color images. To the inventors' best knowledge, this may be the first attempt by using Moran's I statistics for color image de-noising. This is an adaptive filter in which the MI value and response of four 1-D Laplacian kernels are calculated for each 3 by 3 neighborhood window. This two-level noise detection scheme works efficiently as it has the capability of distinguishing a given pixel as noise or not. The VMF is then used to process those noisy pixels and leave noise-free pixels untouched. The inventive filter can be considered as an efficient extension of the VMF in a sense. As an extension, the inventive filter can achieve better de-noising results and efficient time complexity for the color images which are corrupted with random-valued impulse noises. To determine if a pixel is noise or not, two levels of detection are used. The first level is controlled by the MI value and the second level is measured by the response of four 1-D Laplacian kernels. An empirical study was able to estimate the threshold value for Moran's I statistics. An interpolation method was also established which can roughly estimate the threshold value which is used in the comparison with the response of four 1-D Laplacian kernels for an image being de-noised based on the entropy measure. The threshold value calculated with this interpolation method was tested and illustrated with good de-noising results.

Moran's I statistics shows an interesting result in the application of color images for detecting random-valued impulse noises. The inventive MIVMF was compared with other vector-type median filters including VMF, BVDF, CWVMF, ACWVMF, PGVMF, and RSVMF using the criteria of Peak Signal-to-Noise Ratio (PSNR) and Structural Similarity Index Metric (SSIM). The inventive MIVMF showed the promising de-noising result based on those criteria. In terms of the complexity measured in entropy, the MIVMF was faster than those filters tested, no matter in which noise level. For the PSNR, the MIVMF had a higher value than those filters compared. By the visualization, the proposed MIVMF avoided the image blurring results, preserved edge details in the image, and achieved superior noise reduction. This kind of spatial statistic was very useful in the color image de-noising algorithm.

The inventive method estimated the threshold values and successfully used them in the inventive filter. Determining an optimal and adaptive threshold value for detecting a noise pixel remains challenging in exploration of Moran's I statistics. If this threshold value can be estimated with an adaptive approach, it would be more useful to generate better de-noising outcomes. This disclosure applied the concept of spatial autocorrelation based on Moran's I statistics and 1-D Laplacian kernels for the impulse noise detection in color images. It concentrated on the non-fuzzy vector-type median filters. There exist several fuzzy vector-type filters which also work well for the noise detection and removal. Work is now concentrating on developing an adaptive method that can estimate the threshold values more accurately, determining if the MIVMF is suitable and efficient for hyperspectral remote sensing images, extending the inventive detection scheme to other noise models such as Gaussian noise, and exploring the fuzzy vector-type median filters and determine if the fuzzy mathematics can improve the inventive MIVMF performance for de-noising.

Each of the following references and any other reference cited are expressly incorporated by reference herein in its entirety.

Lebrun et al., Secrets of image denoising cuisine, Acta Numerica, pp. 1-102, Cambridge University Press (2012).

Xie and Beni, A validity measure for fuzzy clustering, IEEE Transactions on Pattern Analysis and Machine Intelligence, vol. 13, no. 8, pp. 841-847 (1991).

Zhou, Cognition and removal of impulse noise with uncertainty, IEEE Transaction on Image Processing, vol. 21, no. 7, pp. 3157-3167 (2012).

Zhang and Karim, A new impulse detector for switching median filters, IEEE Signal Processing Letters, vol. 9, no. 11 (2002).

Eng and Ma, Noise Adaptive Soft-Switching Median Filter, IEEE Transaction on Image Processing, vol. 10, no. 2, pp. 242-251 (2001).

Abreu et al., A New Efficient Approach for the Removal of Impulse Noise from Highly Corrupted Images, IEEE Transaction on Image Processing, vol. 5, no. 6, pp. 1012-1025 (1996).

Ahmed and Das, Removal of High-Density Salt-and-Pepper Noise in Images with an Iterative Adaptive Fuzzy Filter Using Alpha-Trimmed Mean, IEEE Transaction on Fuzzy Systems, vol. 22, no. 5, pp. 1352-1358 (2014).

Lukac and Plataniotis, Color Image Processing, Method and Applications, FL, CRC Press (2007).

Novoselac and Zovko-Cihlar, Image noise deduction by vector median filter, 54th International Symposium ELMAR-2012, Zadar Croatia (2012).

Celebi et al., Nonlinear vector filtering for impulse noise removal from color images, Journal of Electronic Imaging, 16(3) (2007).

Smolka et al., Nonlinear techniques for color image processing, in Nonlinear Signal and Image Processing: Theory, Methods, and Applications (Editors Barner and Arce), pp. 445-505, Boca Raton Fla. CRC Press (2004).

Celebi and Aslandogan, Robust switching vector median filter for impulsive noise removal, Journal of Electronic Imaging 17(4) (2008).

Lukac et al., Vector sigma filters for noise detection and removal in color images, Journal of Visual Communication & Image Representation, 17, pp. 1-267 (2006).

Chen et al., A novel image quality index using Moran I statistics, Physics in Medicine and Biology, 48(8):N131-N137 (2003).

Chuang and Huang, Assessment of noise in a digital image using the join-count statistic and the Moran test, Physics in Medicine and Biology, 37(2):357-69 (1992).

Astola et al., Vector median filters, Proc. IEEE, 78(4), pp. 678-689 (1990).

Liu, Adaptive scalar and vector median filtering of noisy color images based on noise estimation, IET Image Process, vol. 5, no. 6, pp. 541-553 (2010).

Lukac and Smolka, Application of the adaptive center-weighted vector median framework for the enhancement of cDNA microarray images, International Journal of Applied Mathematics and Computer Science, vol. 13, no. 3, pp. 369-383 (2003).

Nagabhushna, Quality assessment of resultant images after processing, Computer Engineering and Intelligent Systems, ISSN 2222-1719, vol. 3, no. 7 (2012).

Malpica and Bovik, SSIM based range image quality assessment, 4th international workshop on Video Processing and Quality Metrics for Consumer Electronics, Scottsdale Ariz. (2009).

Smolka and Chydzinski, Fast detection and impulsive noise removal in color images, Real-Time Imaging, 11, pp. 389-402 (2005).

Lukac et al. Vector filtering for color imaging, open a world of possibility, IEEE Signal Processing Magazine [74], (2005).

Chen and Wu, Adaptive impulse detection using center-weighted median filter, IEEE Signal Process Letters, vol. 8, no. 1, pp. 1-3 (2001).

Kenny et al., Peer group image enhancement, IEEE Transaction on Image Processing, vol. 10, no. 2, pp. 326-334 (2001).

Smolka and Perczak, Generalized vector median filter, Proceedings of the 5th International Symposium on image and Signal Processing and Analysis (2007).

Smolka, Soft switching technique for impulsive noise removal in color images, 5th International Conference on Computational Intelligence, Communication Systems and Networks (2013).

Chang, Hung, Liu, and Yin, A Denoising Algorithm for Remote Sensing Images with Impulse Noise, IEEE International Conference on Geoscience and Remote Sensing (IGARSS 2016), Beijing China, Jul. 10-15, 2016.

Rogerson, Statistical methods for geography, $2^{nd}$ ed. London, UK: Sage Publications, (2006).

Moran, The interpretation of statistical maps, Journal of the Royal Statistical Society Series B10, pp. 245-251, (1948).

The embodiments shown and described in the specification are only specific embodiments of inventors who are skilled in the art and are not limiting in any way. Therefore, various changes, modifications, or alterations to those embodiments may be made without departing from the spirit of the invention in the scope of the following claims.

What is claimed is:

1. A method for impulse noise detection and removal in a color image, the method comprising the steps of (a) reading a noise color image and setting threshold values based on the image;

(b) calculating Moran's I value (MI) in a neighborhood of a pixel of the image;

(c) evaluating one or more kernel response values in the neighborhood of the pixel and selecting a minimum kernel response value (Min); and (d) removing, using a filter and based on at least one or more of the MI or Min, the pixel as noise.

2. The method of claim 1, wherein the calculating Moran's I value (MI) in a neighborhood of a pixel of the image is executed within a defined filtering window for each color component of the color image.

3. The method of claim 1, wherein the evaluating a plurality of 1-D Laplacian kernel response values in the neighborhood of the pixel and selecting a minimum kernel response value (Min) is executed for each color component of the color image.

4. The method of claim 1, wherein the pixel comprises a color pixel.

5. The method of claim 1, wherein the one or more kernel response values is based on a laplacian kernel.

6. The method of claim 1, wherein the one or more kernel response values is based on at least one of a first kernel sensitive to a horizontal direction or a second kernel sensitive to a vertical direction.

7. The method of claim 1, wherein the one or more kernel response values is based on a plurality of laplacian kernels comprising a first kernel sensitive to a horizontal direction, a second kernel sensitive to a vertical direction, a third kernel sensitive to a 45 degree direction, and a fourth kernel sensitive to a 135 degree direction.

8. The method of claim 1, wherein the noise filter is configured to filter impulse noise.

9. The method of claim 1, wherein the noise filter comprises a vector median filter (VMF).

* * * * *